United States Patent
Zheng et al.

(10) Patent No.: US 10,506,313 B2
(45) Date of Patent: Dec. 10, 2019

(54) UPSTREAM DATA EQUALIZATION METHOD, APPARATUS, AND SYSTEM CROSS-REFERENCE TO RELATED APPLICATIONS

(71) Applicant: Huawei Technologies Co., Ltd., Shenzhen, Guangdong (CN)

(72) Inventors: Jianyu Zheng, Wuhan (CN); Shengping Li, Wuhan (CN); Xuming Wu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/218,665

(22) Filed: Dec. 13, 2018

(65) Prior Publication Data

US 2019/0116404 A1    Apr. 18, 2019

Related U.S. Application Data

(63) Continuation of application No. PCT/CN2016/085747, filed on Jun. 14, 2016.

(51) Int. Cl.
*H04J 14/00* (2006.01)
*H04Q 11/00* (2006.01)

(52) U.S. Cl.
CPC ..... *H04Q 11/0067* (2013.01); *H04Q 11/0066* (2013.01); *H04Q 2011/0064* (2013.01); *H04Q 2011/0079* (2013.01)

(58) Field of Classification Search
CPC .......... H04Q 11/0067; H04Q 11/0066; H04Q 2011/0064; H04Q 2011/0079;
(Continued)

(56) References Cited

U.S. PATENT DOCUMENTS 6,785,340 B1 *  8/2004  Stockman ........... H04L 25/4927
                                              375/245
7,764,886 B2 *  7/2010  Dalton .................. H04B 10/27
                                              398/207
(Continued)

FOREIGN PATENT DOCUMENTS

CN          1939020 A       3/2007
CN        101449497 A       6/2009
(Continued)

*Primary Examiner* — Hibret A Woldekidan
(74) *Attorney, Agent, or Firm* — Kilpatrick Townsend & Stockton LLP

(57) ABSTRACT

Embodiments relate to the field of PON technologies, and provide a method, apparatus, and system. The method includes: receiving capability information that is sent by an ONU by using a first preamble; calculating a tap coefficient based on the received first preamble if the capability information indicates that the ONU has an equalization capability; sending the tap coefficient to the ONU, where the ONU updates a tap coefficient of a first equalizer in the ONU based on the received tap coefficient, and when subsequently sending upstream data, sends, by using a second preamble, the upstream data equalized by using the first equalizer, and a length of the second preamble is less than a length of the first preamble; receiving the upstream data; and equalizing the received upstream data based on the second preamble by using a second equalizer in an OLT. In this way, upstream overheads can be reduced.

20 Claims, 21 Drawing Sheets

(58) Field of Classification Search
CPC .............. H04Q 11/0478; H04J 3/0682; H04B 10/1143; H04B 10/27; H04B 10/272; H04B 3/46; H04L 2012/561
USPC .............. 398/72, 71, 70, 78, 149, 58, 66, 67
See application file for complete search history.

(56) References Cited

U.S. PATENT DOCUMENTS

| | | | |
|---|---|---|---|
| 8,270,837 B2* | 9/2012 | Yeh .................... | H04B 10/27 398/173 |
| 8,619,591 B2* | 12/2013 | Zhang ................ | H04B 10/0773 370/236.2 |
| 9,363,013 B2* | 6/2016 | Khotimsky ........ | H04Q 11/0067 |
| 2007/0211618 A1 | 9/2007 | Cooper et al. | |
| 2009/0154488 A1* | 6/2009 | Oron .................. | H04O 11/0067 370/458 |
| 2012/0099865 A1 | 4/2012 | Ishii et al. | |
| 2013/0108272 A1 | 5/2013 | Miura | |
| 2014/0029655 A1 | 1/2014 | Thompson et al. | |
| 2016/0036527 A1 | 2/2016 | Zhou | |
| 2017/0033952 A1* | 2/2017 | Aravind ............ | H04L 25/03057 |
| 2017/0288915 A1* | 10/2017 | Aravind ............ | H04L 25/03057 |
| 2019/0069055 A1* | 2/2019 | Campos ............ | H04Q 11/0067 |
| 2019/0223208 A1* | 7/2019 | Yoshimoto ............ | H04L 1/0061 |
| 2019/0229843 A1* | 7/2019 | Yoshimoto ............ | H04L 1/0041 |

FOREIGN PATENT DOCUMENTS

| | | | |
|---|---|---|---|
| CN | 102684793 A | * | 9/2012 |
| CN | 102684793 A | | 9/2012 |
| CN | 102804618 A | | 11/2012 |
| CN | 103634054 A | | 3/2014 |

* cited by examiner

UPSTREAM DATA EQUALIZATION METHOD, APPARATUS, AND SYSTEM CROSS-REFERENCE TO RELATED APPLICATIONS

CROSS-REFERENCE TO RELATED APPLICATIONS

This application is a continuation of International Application No. PCT/CN2016/085747, filed on Jun. 14, 2016, the disclosure of which is hereby incorporated by reference in its entirety.

TECHNICAL FIELD

Embodiments of the present application relate to the field of passive optical network technologies, and in particular, to an upstream data equalization method, apparatus, and system.

BACKGROUND

In a passive optical network (PON), severe intersymbol interference (ISI) may be caused by link dispersion and device bandwidth limitation at a high upstream rate.

A channel equalization technology is an existing technical means to suppress ISI of a communications system to ensure link performance. Apparently, the channel equalization technology can be applied to a high speed PON network to alleviate an ISI problem. However, different from a conventional continuous communication data mode, a PON network upstream burst mode has its particularity. That is, upstream data includes a plurality of discontinuous short-term burst blocks, and a channel characteristic of each burst block is different from a channel characteristic of another burst block adjacent to the burst block. Therefore, to equalize each short-term burst block, in an implementation process in the prior art, a length of a preamble of each short-term burst block needs to be extended, so that an optical line terminal (OLT) can extract the channel characteristic of each short-term burst block one by one based on the extended preamble, and perform corresponding channel equalization for each short-term burst block based on the channel characteristic.

In a process of implementing the present disclosure, the inventors find that the foregoing upstream data equalization method includes at least the following problem:

Because the preamble of each short-term burst block needs to be extended, the foregoing method undoubtedly consumes higher upstream overheads.

SUMMARY

To resolve a problem of consuming higher upstream overheads in the prior art, embodiments of the present disclosure provide an upstream data equalization method, apparatus, and system. The technical solutions are as follows:

According to a first aspect, an upstream data equalization method is provided, where the upstream data equalization method includes:

An optical network unit (ONU) sends capability information of the ONU to an OLT by using a first preamble, where the capability information is used to indicate whether the ONU has an equalization capability. Correspondingly, the OLT receives the capability information that is sent by the ONU by using the first preamble.

After the OLT receives the capability information, if the capability information indicates that the ONU has the equalization capability, the OLT calculates a tap coefficient based on the received first preamble, and sends the tap coefficient to the ONU. Correspondingly, the ONU receives the tap coefficient fed back by the OLT, and after receiving the tap coefficient, updates a tap coefficient of a first equalizer in the ONU based on the tap coefficient.

Subsequently, when the ONU needs to send upstream data, the ONU equalizes the upstream data by using the first equalizer, and sends the equalized upstream data to the OLT by using a second preamble. Correspondingly, the OLT receives the upstream data that is sent by the ONU by using the second preamble, and equalizes the received upstream data based on the second preamble by using a second equalizer in the OLT.

The ONU reports the capability information to the OLT by using the first preamble, so that the OLT can detect, based on the capability information, whether the ONU has the equalization capability, and when a detection result is that the ONU has the equalization capability, calculate the tap coefficient based on the received first preamble carrying a channel response, and feed back the tap coefficient to the ONU. The ONU updates the tap coefficient of the first equalizer in the ONU based on the received tap coefficient, and when subsequently sending the upstream data, sends the upstream data equalized by using the first equalizer to the OLT by using the relatively short second preamble. Subsequently, the OLT may equalize, by using the second equalizer, the upstream data based on the received second preamble carrying a channel response. Therefore, a problem of consuming higher upstream overheads in the prior art is resolved, and upstream overheads that need to be consumed can be reduced.

In a first possible implementation of the first aspect, steps before the ONU updates the tap coefficient of the first equalizer based on the tap coefficient may be performed in a process in which the ONU performs registration.

The tap coefficient of the first equalizer is updated when the ONU performs registration and gets online, so that when the upstream data is subsequently sent, the upstream data may be sent by using the relatively short second preamble, thereby further reducing the upstream overheads that need to be consumed.

In a second possible implementation of the first aspect, when the method is applied to an EPON system, the step of sending, by an ONU, capability information to an OLT by using a first preamble may include:

sending a registration request message REGISTER_REQ to the OLT by using the default first preamble, where REGISTER_REQ carries the capability information.

Correspondingly, the receiving, by the OLT, the capability information that is sent by the ONU by using the first preamble includes:

receiving the registration request message REGISTER_REQ that is sent by the ONU by using the default first preamble, where REGISTER_REQ carries the capability information;

the sending, by the OLT, the tap coefficient to the ONU includes:

sending a first authorization acknowledgment message REGISTER1 to the ONU, where REGISTER1 carries the tap coefficient; or sending a second authorization acknowledgment message GATE2 to the ONU, where GATE2 carries the tap coefficient; and the receiving, by the ONU, the tap coefficient fed back by the OLT includes:

receiving the first authorization acknowledgment message REGISTER1 sent by the OLT, where REGISTER1 carries the tap coefficient; or receiving the second authorization acknowledgment message GATE2 sent by the OLT, where GATE2 carries the tap coefficient.

When the method is applied to a GPON system or an XG-PON system, because in the GPON system or the XG-PON system, a length and a pattern of the first preamble and a length and a pattern of the second preamble are delivered by the OLT to the ONU, and may be sent together or may be sent separately, in a third possible implementation of the first aspect, the method further includes:

The OLT sends a first downstream message to the ONU, where the first downstream message carries the length and the pattern of the first preamble and the length and the pattern of the second preamble; and when the OLT is applied to the GPON system, the first downstream message is an upstream management message (Upstream_Overhead); or when the OLT is applied to the XG-PON system, the first downstream message is a parameter set message Profile. Correspondingly, the ONU receives the first downstream message sent by the OLT, where the first downstream message carries the length and the pattern of the first preamble and the length and the pattern of the second preamble; and when the ONU is applied to the GPON system, the first downstream message is an upstream management message (Upstream_Overhead); or when the ONU is applied to the XG-PON system, the first downstream message is a parameter set message (Profile).

The sending, by an ONU, capability information of the ONU to an OLT by using a first preamble includes: sending a first upstream message to the OLT based on the first downstream message by using the first preamble, where the first upstream message carries the capability information, the first upstream message is a message after the first downstream message when the ONU performs registration, and the first upstream message is an ONU serial number message (Serial_Number_ONU) or a ranging response message (Registration). Correspondingly, the receiving, by the OLT, the capability information that is sent by the ONU by using the first preamble includes: receiving the first upstream message that is sent by the ONU based on the first downstream message by using the first preamble, where the first upstream message carries the capability information, the first upstream message is a message after the first downstream message when the ONU performs registration, and the first upstream message is an ONU serial number message (Serial_Number_ONU).

The sending, by the OLT, the tap coefficient to the ONU includes: sending a second downstream message to the ONU, where the second downstream message carries the tap coefficient, the second downstream message is a message after the first upstream message when the ONU performs registration, and the second downstream message is an ONU identifier assignment message (Assign_ONU-ID), a ranging authorization message (Request_Registration), or a delay equalization message (Ranging_Time). Correspondingly, the receiving, by the ONU, the tap coefficient fed back by the OLT includes: receiving the second downstream message sent by the OLT, where the second downstream message carries the tap coefficient, the second downstream message is a message after the first upstream message when the ONU performs registration, and the second downstream message is an ONU identifier assignment message (Assign_ONU-ID), a ranging authorization message (Request_Registration), or a delay equalization message (Ranging_Time).

In a fourth possible implementation of the first aspect, the method further includes:

The OLT sends a first downstream message to the ONU, where the first downstream message carries the length and the pattern of the first preamble; and when the OLT is applied to the GPON system, the first downstream message is an upstream management message (Upstream_Overhead); or when the OLT is applied to the XG-PON system, the first downstream message is a parameter set message Profile. Correspondingly, the ONU receives the first downstream message sent by the OLT, where the first downstream message carries the length and the pattern of the first preamble; and when the ONU is applied to the GPON system, the first downstream message is an upstream management message (Upstream_Overhead); or when the ONU is applied to the XG-PON system, the first downstream message is a parameter set message (Profile).

The sending, by an ONU, capability information of the ONU to an OLT by using a first preamble includes:

sending a first upstream message to the OLT based on the first downstream message by using the first preamble, where the first upstream message carries the capability information, the first upstream message is a message after the first downstream message when the ONU performs registration, and the first upstream message is an ONU serial number message (Serial_Number_ONU) or a ranging response message (Registration). Correspondingly, the receiving the capability information that is sent by the ONU by using the first preamble includes: receiving the first upstream message that is sent by the ONU based on the first downstream message by using the first preamble, where the first upstream message carries the capability information, the first upstream message is a message after the first downstream message when the ONU performs registration, and the first upstream message is an ONU serial number message (Serial_Number_ONU).

The sending, by the OLT, the tap coefficient to the ONU includes: sending a second downstream message to the ONU, where the second downstream message carries the tap coefficient and the length and the pattern of the second preamble, the second downstream message is a message after the first upstream message when the ONU performs registration, and the second downstream message is an ONU identifier assignment message (Assign_ONU-ID), a ranging authorization message (Request_Registration), or a delay equalization message (Ranging_Time). Correspondingly, the receiving, by the ONU, the tap coefficient fed back by the OLT includes:

receiving the second downstream message sent by the OLT, where the second downstream message carries the tap coefficient and the length and the pattern of the second preamble, the second downstream message is a message after the first upstream message when the ONU performs registration, and the second downstream message is an ONU identifier assignment message (Assign_ONU-ID), a ranging authorization message (Request_Registration), or a delay equalization message (Ranging_Time).

With reference to any one of the first aspect or the first possible implementation to the fourth possible implementation of the first aspect, in a fifth possible implementation, after the ONU receives the tap coefficient sent by the OLT, the ONU may feed back first acknowledgment information to the OLT. Correspondingly, the OLT may receive the first acknowledgment information. After the OLT receives the first acknowledgment information, the OLT may learn that the ONU has successfully received the tap coefficient, and has successfully assigned a value to the tap coefficient of the first equalizer in the ONU.

With reference to any one of the first aspect or the first possible implementation to the fifth possible implementation of the first aspect, in a sixth possible implementation, because a channel response between the ONU and the OLT changes with time, to ensure accuracy, the tap coefficient in the ONU may be further updated. Specifically, the method includes:

The OLT sends a coefficient update notification message to the ONU having the equalization capability. The ONU receives the coefficient update notification message sent by the OLT.

The ONU sends an update acknowledgment message to the OLT by using the first preamble, where the OLT re-calculates the tap coefficient based on the first preamble in the received update acknowledgement message, and feeds back the tap coefficient. Correspondingly, the OLT receives the update acknowledgment message that is sent by the ONU by using the first preamble.

After receiving the update acknowledgment message, the OLT re-calculates the tap coefficient based on the first preamble carried in the update acknowledgment message, and feeds back the calculated tap coefficient to the ONU.

The ONU receives the tap coefficient fed back by the OLT, updates the tap coefficient of the first equalizer based on the received tap coefficient, when needing to send upstream data, equalizes the upstream data by using the first equalizer, and sends the equalized upstream data to the OLT by using the second preamble. Correspondingly, the OLT receives the upstream data that is sent by the ONU and that carries the second preamble, and equalizes the received upstream data based on the second preamble by using the second equalizer. The length of the second preamble is less than the length of the first preamble.

With reference to the sixth possible implementation of the first aspect, in a seventh possible implementation, after the ONU receives the updated tap coefficient fed back by the OLT, the ONU may feed back second acknowledgment information to the OLT. Correspondingly, the OLT may receive the second acknowledgment information. After the OLT receives the second acknowledgment information, the OLT may determine that the ONU has successfully received the updated tap coefficient, and the ONU has successfully re-assigned a value to the tap coefficient of the first equalizer.

In the foregoing, steps related to an OLT side may be implemented as an upstream data equalization method on the OLT side, and steps related to an ONU side may be separately implemented as an upstream data equalization method on the ONU side.

According to a second aspect, an upstream data equalization system is provided, where the system includes an ONU and an OLT.

The ONU is configured to send capability information of the ONU to the OLT by using a first preamble, where the capability information indicates whether the ONU has an equalization capability.

The OLT is configured to receive the capability information that is sent by the ONU by using the first preamble, calculate a tap coefficient based on the received first preamble if the capability information indicates that the ONU has the equalization capability, and send the tap coefficient to the ONU.

The ONU is further configured to receive the tap coefficient, update a tap coefficient of a first equalizer in the ONU based on the tap coefficient, equalize upstream data by using the first equalizer, and send the equalized upstream data to the OLT by using a second preamble, where a length of the second preamble is less than a length of the first preamble.

The OLT is further configured to receive the upstream data that is sent by the ONU by using the second preamble, and equalize the received upstream data based on the second preamble by using a second equalizer in the OLT.

According to a third aspect, an upstream data equalization apparatus is provided, where the upstream data equalization apparatus is applied to an OLT, and the upstream data equalization apparatus includes a processor and a communications interface connected to the processor, where the processor is configured to execute an instruction, and the processor executes the instruction to implement the upstream data equalization method related to the OLT side in the first aspect.

According to a fourth aspect, an upstream data equalization apparatus is provided, where the upstream data equalization apparatus is applied to an ONU, and the upstream data equalization apparatus includes a processor and a communications interface connected to the processor, where the processor is configured to execute an instruction, and the processor executes the instruction to implement the upstream data equalization method related to the ONU side in the first aspect.

According to a fifth aspect, an upstream data equalization apparatus is provided, where the upstream data equalization apparatus is applied to an OLT, and the upstream data equalization apparatus includes at least one unit, where the at least one unit is configured to implement the upstream data equalization method provided in the first aspect.

According to a sixth aspect, an upstream data equalization apparatus is provided, where the upstream data equalization apparatus is applied to an ONU, and the upstream data equalization apparatus includes at least one unit, where the at least one unit is configured to implement the upstream data equalization method provided in the first aspect.

According to a seventh aspect, an upstream data equalization system is provided, where the system includes an OLT and an ONU, where the OLT includes the upstream data equalization apparatus in the third aspect, and the ONU includes the upstream data equalization apparatus in the fourth aspect.

According to an eighth aspect, an upstream data equalization system is provided, where the system includes an OLT and an ONU, where the OLT includes the upstream data equalization apparatus in the fifth aspect, and the ONU includes the upstream data equalization apparatus in the sixth aspect.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

FIG. 3A-1 and FIG. 3A-2 are a flowchart of an upstream data equalization method according to another embodiment of the present disclosure;

FIG. 3B-1 and FIG. 3B-2 are a flowchart of another upstream data equalization method according to another embodiment of the present disclosure;

FIG. 4A-1 and FIG. 4A-2 are a flowchart of an upstream data equalization method according to still another embodiment of the present disclosure;

FIG. 5A-1 and FIG. 5A-2 are a flowchart of an upstream data equalization method according to still another embodiment of the present disclosure;

FIG. 6A-1 and FIG. 6A-2 are a flowchart of a tap coefficient update method according to still another embodiment of the present disclosure;

DESCRIPTION OF EMBODIMENTS

To make the objectives, technical solutions, and advantages of the present disclosure clearer, the following further describes the implementations of the present disclosure in detail with reference to the accompanying drawings.

Figure 1:
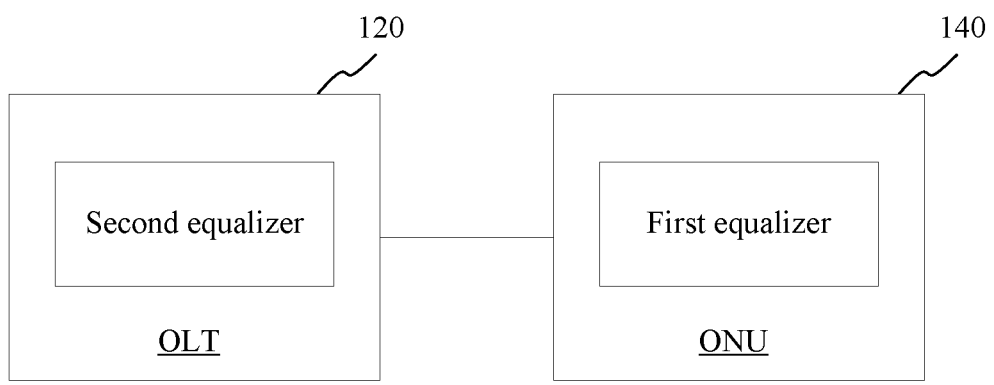
FIG. 1 is a schematic diagram of an implementation environment related to an upstream data equalization method according to the embodiments of the present disclosure.

FIG. 1 is a schematic diagram of an implementation environment related to an upstream data equalization method according to the embodiments of the present disclosure. As shown in FIG. 1, the implementation environment may include an OLT 120 and an ONU 140.

The OLT 120 is a core part of an optical access network, and is a platform providing a plurality of services. During actual implementation, the OLT 120 is usually placed at a central office to provide a fiber interface of a passive optical network for a user. Main functions of the OLT 120 are as follows: first, connecting to an upper-layer network to complete upstream access of the PON network; second, connecting to the ONU 140 by using an optical distribution network (ODN) network, to implement functions such as control, management, and ranging for the ONU 140. In the embodiments of the present disclosure, the OLT 120 may include a second equalizer, and the second equalizer is configured to equalize received upstream data sent by the ONU 140.

The ONU 140 is a user end device in the optical network. During actual implementation, the ONU 140 is usually placed on a user end, and cooperates with the OLT 120 to implement Ethernet Layer 2 and Ethernet Layer 3 functions, to provide voice, data, and multimedia services for a user. Main functions of the ONU 140 are as follows: first, selectively receiving data sent by the OLT; second, buffering Ethernet data of the user, and sending the Ethernet data in an upstream direction within a sending window assigned by the OLT. In the embodiments, the ONU 140 includes a first equalizer, and the first equalizer is configured to equalize upstream data that needs to be sent.

The OLT 120 and the ONU 140 may be connected by using a fiber.

It should be noted that, the upstream data equalization method may be applied to an Ethernet passive optical network (EPON) system, a gigabit-capable passive optical network (GPON) system, or an XG-PON system. In other words, the OLT 120 and the ONU 140 may be applied to the EPON system, the GPON system, or the XG-PON system.

Figure 2:
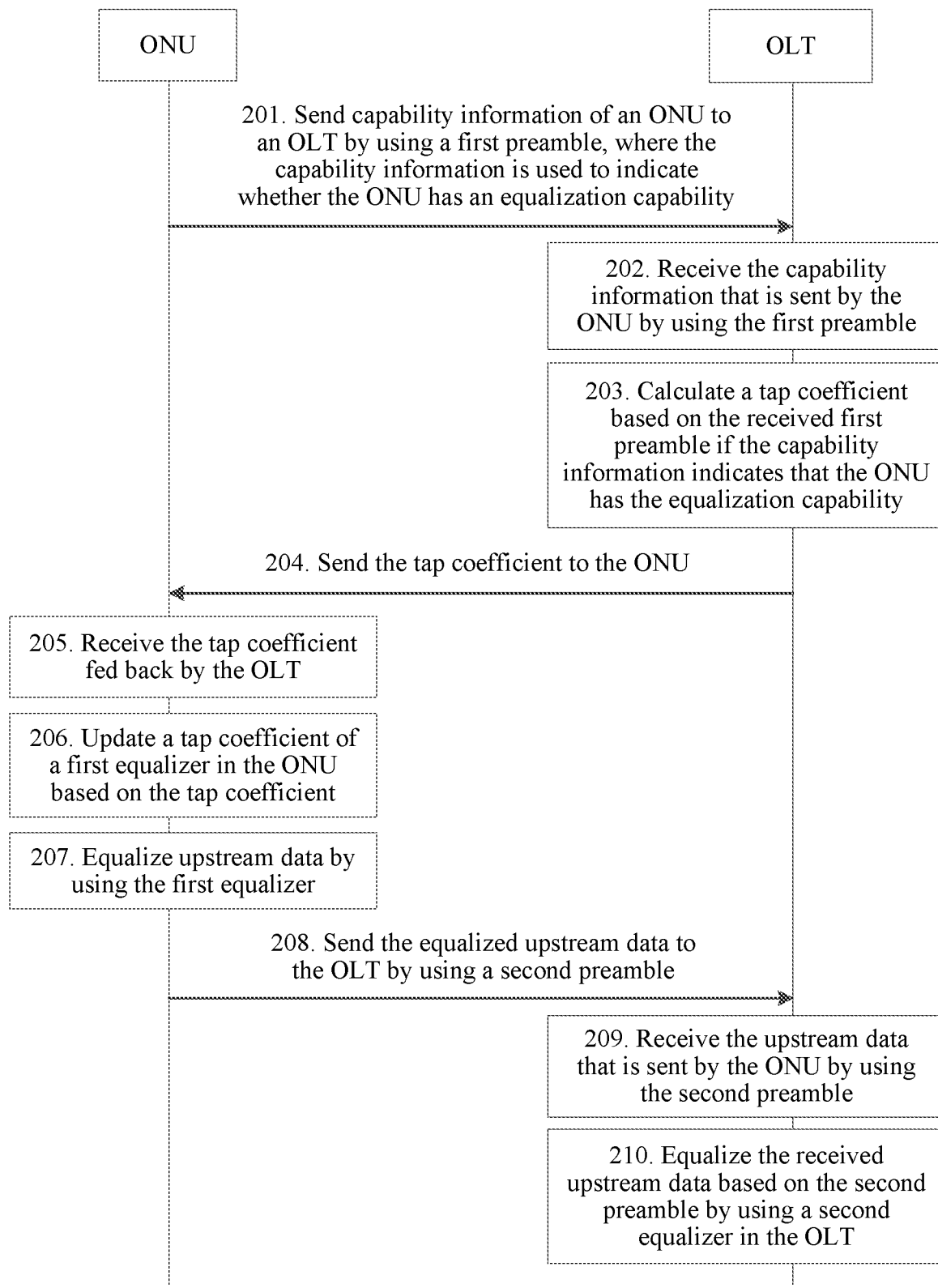
FIG. 2 is a flowchart of an upstream data equalization method according to an embodiment of the present disclosure.

FIG. 2 shows a method embodiment of an upstream data equalization method according to an embodiment of the present disclosure. As shown in FIG. 2, the upstream data equalization method may include the following steps:

Step 201: An ONU sends capability information of the ONU to an OLT by using a first preamble, where the capability information is used to indicate whether the ONU has an equalization capability.

Step 202: The OLT receives the capability information that is sent by the ONU by using the first preamble.

Step 203: The OLT calculates a tap coefficient based on the received first preamble if the capability information indicates that the ONU has the equalization capability.

Step 204: The OLT sends the tap coefficient to the ONU.

Step 205: The ONU receives the tap coefficient fed back by the OLT.

Step 206: The ONU updates a tap coefficient of a first equalizer in the ONU based on the tap coefficient.

Step 207: The ONU equalizes upstream data by using the first equalizer.

Step 208: The ONU sends the equalized upstream data to the OLT by using a second preamble.

Step 209: The OLT receives the upstream data that is sent by the ONU by using the second preamble.

Step 210: The OLT equalizes the received upstream data based on the second preamble by using a second equalizer in the OLT.

In conclusion, according to the upstream data equalization method provided in this embodiment, the ONU reports the capability information to the OLT by using the first preamble, so that the OLT can detect, based on the capability information, whether the ONU has the equalization capability, and when a detection result is that the ONU has the equalization capability, calculate the tap coefficient based on the received first preamble carrying a channel response, and feed back the tap coefficient to the ONU. The ONU updates the tap coefficient of the first equalizer in the ONU based on the received tap coefficient, and when subsequently sending the upstream data, sends the upstream data equalized by using the first equalizer to the OLT by using the relatively short second preamble. Subsequently, the OLT may equalize, by using the second equalizer, the upstream data based on the received second preamble carrying a channel response. Therefore, a problem of consuming higher upstream overheads in the prior art is resolved, and upstream overheads that need to be consumed can be reduced.

In the foregoing embodiment, step 201 to step 205 may be performed in a process in which the ONU performs registration and gets online. The tap coefficient of the first equalizer in the ONU is set when the ONU performs registration and gets online, so that the ONU can subsequently send the upstream data by using the relatively short second preamble, thereby reducing upstream overheads.

Figures 1, 3A:
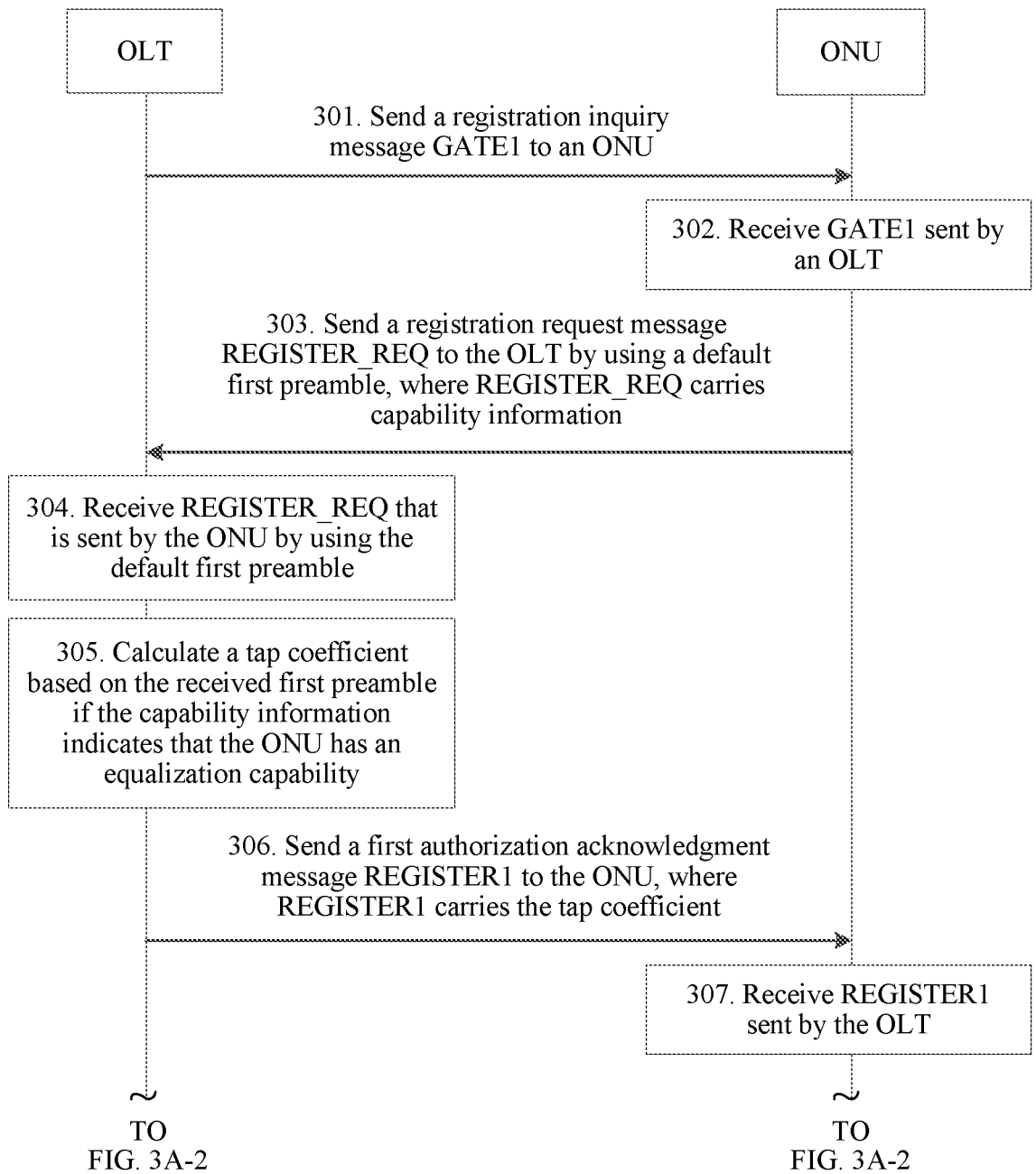
Figures 2, 3A:
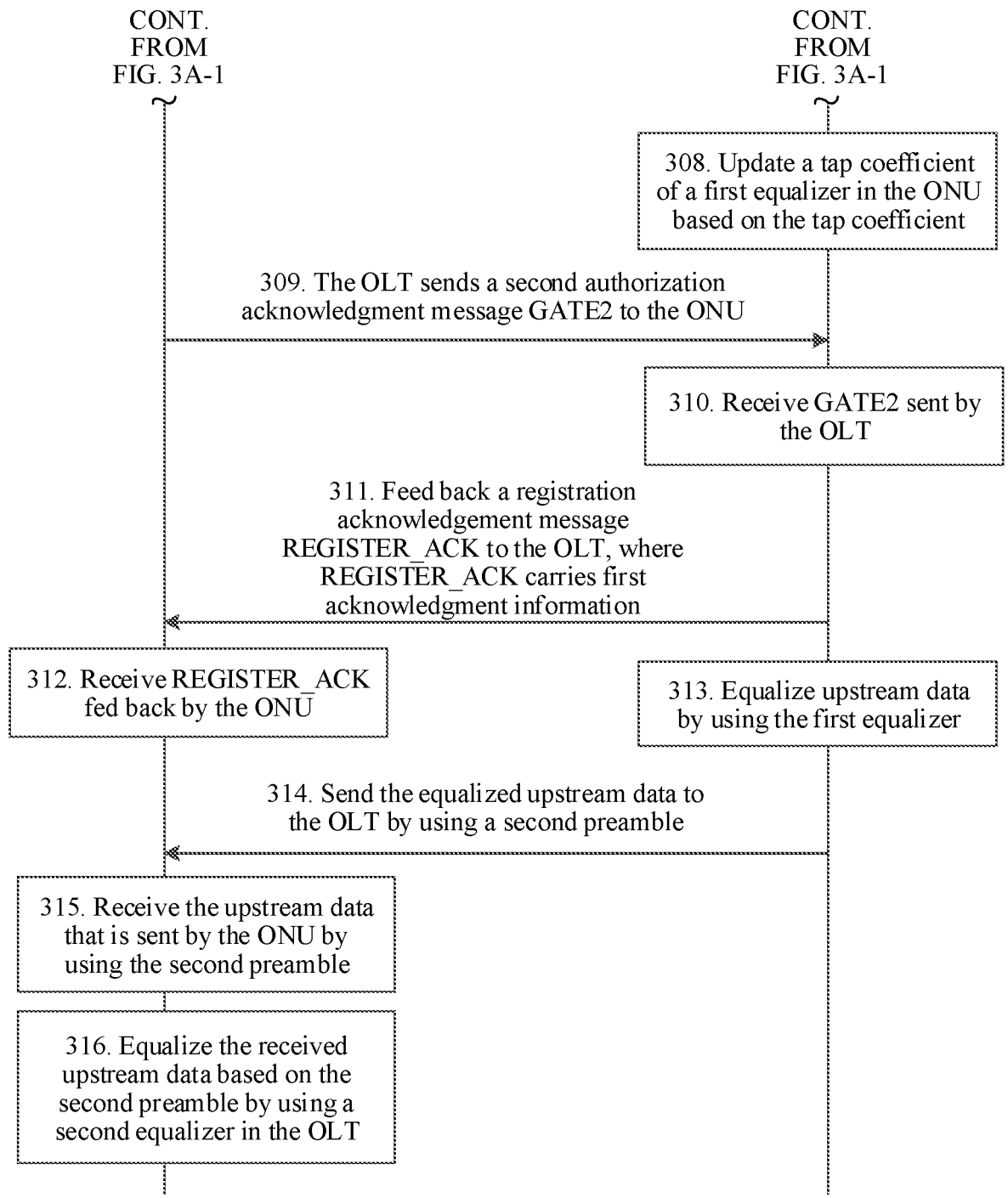

FIG. 3A-1 and FIG. 3A-2 are a method flowchart of an upstream data equalization method according to another embodiment of the present disclosure. This embodiment is described by using an example in which the method is applied to the implementation environment shown in FIG. 1, and is applied to an EPON system. As shown in FIG. 3A-1 and FIG. 3A-2, the upstream data equalization method may include the following steps.

Step 301: An OLT sends a registration inquiry message GATE1 to an ONU.

The OLT periodically delivers the registration inquiry message and performs windowing. Optionally, the OLT may send GATE1 to the ONU. In GATE1, a destination address (DA) is a MAC (Media Access Control) multicast address, a source address (SA) is a MAC address of a source OLT end, and content is an authorization message, a time synchronization message, and discovery information.

Step 302: The ONU receives GATE1 sent by the OLT.

Step 303: The ONU sends a registration request message (REGISTER_REQ) to the OLT by using a default first preamble, where REGISTER_REQ carries capability information.

The first preamble is a preamble whose length and pattern are preset by a designer in the ONU.

Specifically, REGISTER_REQ includes the capability information of the ONU. For example, if the ONU has an equalization capability, REGISTER_REQ includes capability information '1' indicating that the ONU has the equalization capability; otherwise, if the ONU does not have the equalization capability, REGISTER_REQ includes capability information '0' indicating that the ONU does not have the equalization capability.

In a possible implementation, bits 6 to 15 of a discovery information field in REGISTER_REQ are extended, and the capability information is added in the extension. For example, that the ONU has the equalization capability (ONU is pre-equalization capable) is added, or that the ONU does not have the equalization capability (ONU is not pre-equalization capable) is added. For another example, an identifier '1' indicating that the ONU has the equalization capability is added, or an identifier '0' indicating that the ONU does not have the equalization capability is added.

In another possible implementation, a pre-equalization information field is added in a $27^{th}$ byte in REGISTER_REQ, and the capability information is carried in the pre-equalization information field.

Optionally, in REGISTER_REQ, a DA is the MAC control multicast address, an SA is the MAC address of the source OLT end, and content is an authorization waiting message, discovery information, a laser on time, and a laser off time. The capability information may be an item in the content. In other words, the content further includes the capability information in addition to the foregoing information.

It should be noted that, the capability information may alternatively be carried in another field. This is not limited in this embodiment. Moreover, that REGISTER_REQ includes the foregoing content is only an example in this embodiment, and REGISTER_REQ may further include other content during actual implementation. In this embodiment, only content related to this application is described, and other content included in REGISTER_REQ is not limited.

It should be further noted that, when the ONU sends REGISTER_REQ, a first equalizer in the ONU may be off. In other words, the equalization capability of the ONU is off. Optionally, the first equalizer may equalize upstream data by using a default tap coefficient. For example, the used tap coefficient is a primary tap coefficient 1, and another secondary tap coefficient is 0. This is not limited in this embodiment.

Step 304: The OLT receives REGISTER_REQ that is sent by the ONU by using the default first preamble.

Step 305: The OLT calculates a tap coefficient based on the received first preamble if the capability information indicates that the ONU has an equalization capability.

After receiving REGISTER_REQ sent by the ONU, the OLT detects, based on the capability information in REGISTER_REQ, whether the ONU has the equalization capability. If a detection result is that the ONU has the equalization capability, for example, REGISTER_REQ carries the identifier '1', the OLT calculates the tap coefficient based on the received first preamble.

The first preamble received by the OLT is a preamble carrying a channel response. A calculation method for calculating the tap coefficient based on the received first preamble by the OLT may include the following: The OLT performs calculation by using a least mean square (LMS) algorithm, a recursive-least-squares (RLS) algorithm, a minimum mean square error (MMSE) algorithm, a least-squares (LS) algorithm, or an algorithm derived from the foregoing four algorithms. This is not limited in this embodiment.

However, if the detection result is that the ONU does not have the equalization capability, the procedure ends. This is not limited in this embodiment.

Step 306: The OLT sends a first authorization acknowledgment message (REGISTER1) to the ONU, where REGISTER1 carries the tap coefficient.

After the OLT receives REGISTER_REQ, if the detection result is that the ONU has the equalization capability, the OLT sends, to the ONU, REGISTER1 carrying the calculated tap coefficient. If the detection result is that the ONU does not have the equalization capability, the OLT sends, to the ONU, existing REGISTER1, namely, REGISTER1 carrying no tap coefficient.

When REGISTER1 carrying the tap coefficient needs to be sent to the ONU, original REGISTER1 is extended, and the tap coefficient is newly added in extended REGISTER1. Specifically, a $29^{th}$ byte to a $60^{th}$ byte in REGISTER1 are reserved. In this embodiment, a pre-equalization coefficient information field is newly added in the $29^{th}$ byte to an $(X1)^{th}$ byte in REGISTER1, and the tap coefficient is carried in the pre-equalization coefficient information field. X1 is an integer, and the $(X1)^{th}$ byte to the $60^{th}$ byte in REGISTER1 remain reserved.

In REGISTER1, a DA is an ONU MAC address, an SA is an OLT MAC address, and content is a logical link identifier (LLID), an authorization time, and authorization waiting.

Step 307: The ONU receives REGISTER1 sent by the OLT.

Step 308: The ONU updates a tap coefficient of a first equalizer in the ONU based on the tap coefficient.

After receiving REGISTER1, the ONU extracts the tap coefficient carried in REGISTER1, and updates the tap coefficient of the first equalizer in the ONU by using the extracted tap coefficient.

Step 309: The OLT sends a second authorization acknowledgment message GATE2 to the ONU.

In GATE2, a DA is the MAC control multicast address, an SA is the OLT MAC address, and content is authorization information.

In this embodiment, that step 308 is performed before step 309 is only an example. Optionally, step 308 and step 309 may be performed simultaneously, or step 309 is performed before step 308. This is not limited in this embodiment.

Step 310: The ONU receives GATE2 sent by the OLT.

Step 311: The ONU feeds back a registration acknowledgement message (REGISTER_ACK) to the OLT, where REGISTER_ACK carries first acknowledgment information.

In REGISTER_ACK, a DA is the MAC control multicast address, an SA is the ONU MAC address, and content is a response to the LLID and a response to the synchronization time.

Optionally, REGISTER_ACK may further include the first acknowledgment information, where the first acknowledgment information is information that is fed back by the ONU after the ONU successfully receives the tap coefficient. Specifically, an echoed pre-equalization assignment field is newly added in a $26^{th}$ byte of REGISTER_ACK, and one byte is newly added in the echoed pre-equalization assignment field to indicate, to the OLT, that a value has been assigned to the tap coefficient of the ONU. A $27^{th}$ byte to a $60^{th}$ byte in the echoed pre-equalization assignment field remain reserved.

It should be noted that, because the ONU has updated the tap coefficient in step 308, when the ONU feeds back REGISTER_ACK, the ONU may send REGISTER_ACK to the OLT by using a second preamble. A length of the second preamble is less than a length of the first preamble, and the length and a pattern of the second preamble are pre-configured by the designer in the ONU.

Step 312: The OLT receives REGISTER_ACK fed back by the ONU.

After receiving REGISTER_ACK, the OLT completes a handshake with the ONU, and the ONU succeeds in registration and getting online. Subsequently, the ONU may exchange data with the OLT.

Step 313: The ONU equalizes upstream data by using the first equalizer.

Step 314: The ONU sends the equalized upstream data to the OLT by using a second preamble.

After the ONU updates the tap coefficient of the first equalizer, when needing to send the upstream data, the ONU may send the upstream data equalized by using the first equalizer to the OLT by using the second preamble. The length of the second preamble is less than the length of the first preamble, and the length and the pattern of the second preamble are pre-configured by the designer in the ONU.

Step 315: The OLT receives the upstream data that is sent by the ONU by using the second preamble.

Step 316: The OLT equalizes the received upstream data based on the second preamble by using a second equalizer in the OLT.

After the OLT receives the upstream data that is sent by the ONU by using the second preamble, the second equalizer in the OLT may equalize the received upstream data based on the received second preamble carrying a channel response, so that the upstream data meets a convergence condition.

Step 301 to step 312 are steps performed in a process in which the ONU performs registration and gets online, and step 313 to step 316 are a process of sending upstream data after the ONU succeeds in getting online.

In conclusion, according to the upstream data equalization method provided in this embodiment, the ONU reports the capability information to the OLT by using the first preamble, so that the OLT may detect, based on the capability information, whether the ONU has the equalization capability, and when a detection result is that the ONU has the equalization capability, calculate the tap coefficient based on the received first preamble carrying a channel response, and feed back the tap coefficient to the ONU. The ONU updates the tap coefficient of the first equalizer in the ONU based on the received tap coefficient, and when subsequently sending the upstream data, sends the upstream data equalized by using the first equalizer to the OLT by using the relatively short second preamble. Subsequently, the OLT may equalize, by using the second equalizer, the upstream data based on the received second preamble carrying a channel response. Therefore, a problem of consuming specific upstream overheads in the prior art is resolved, and upstream overheads can be reduced.

Figures 1, 3B:
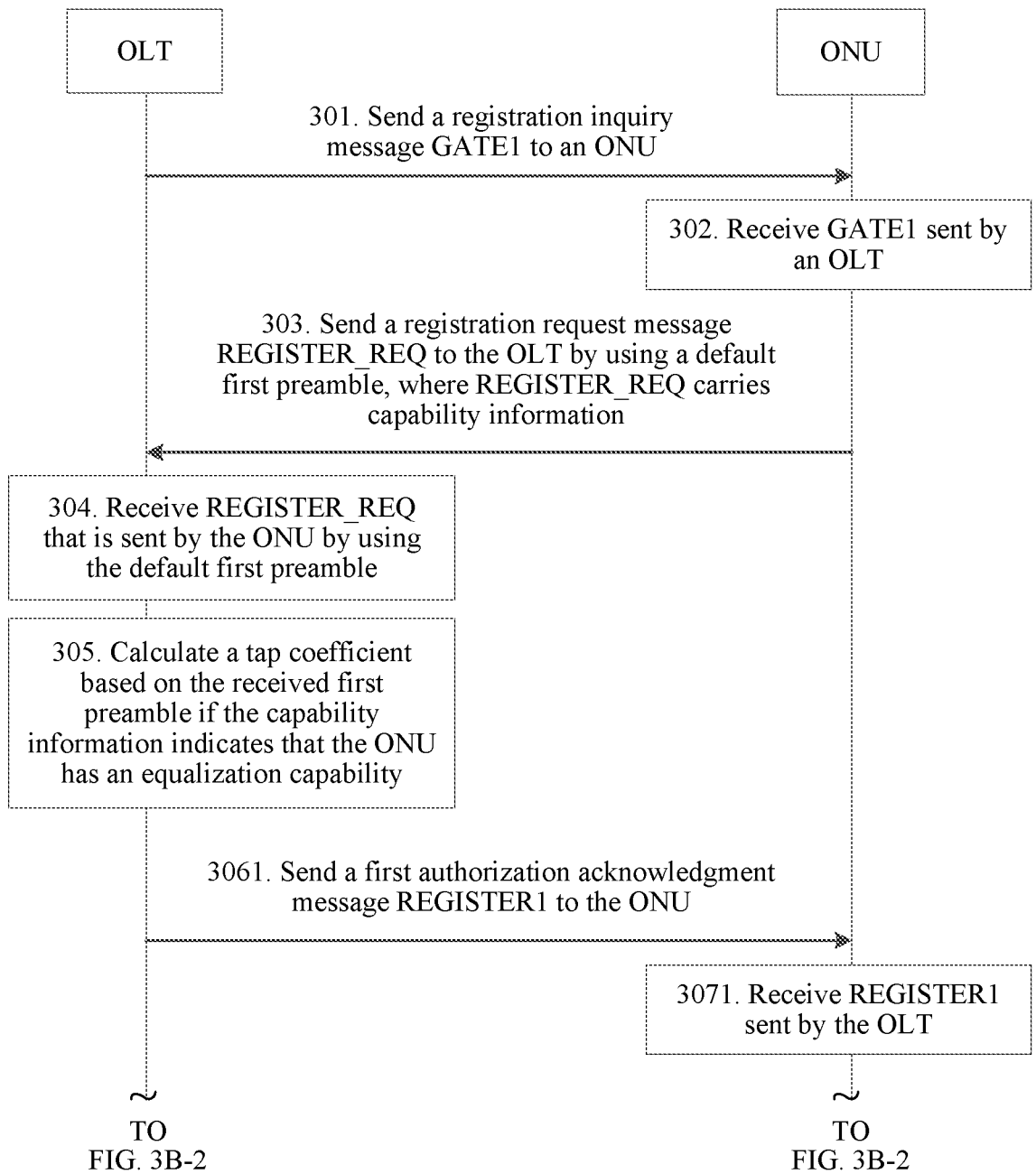
Figures 2, 3B:
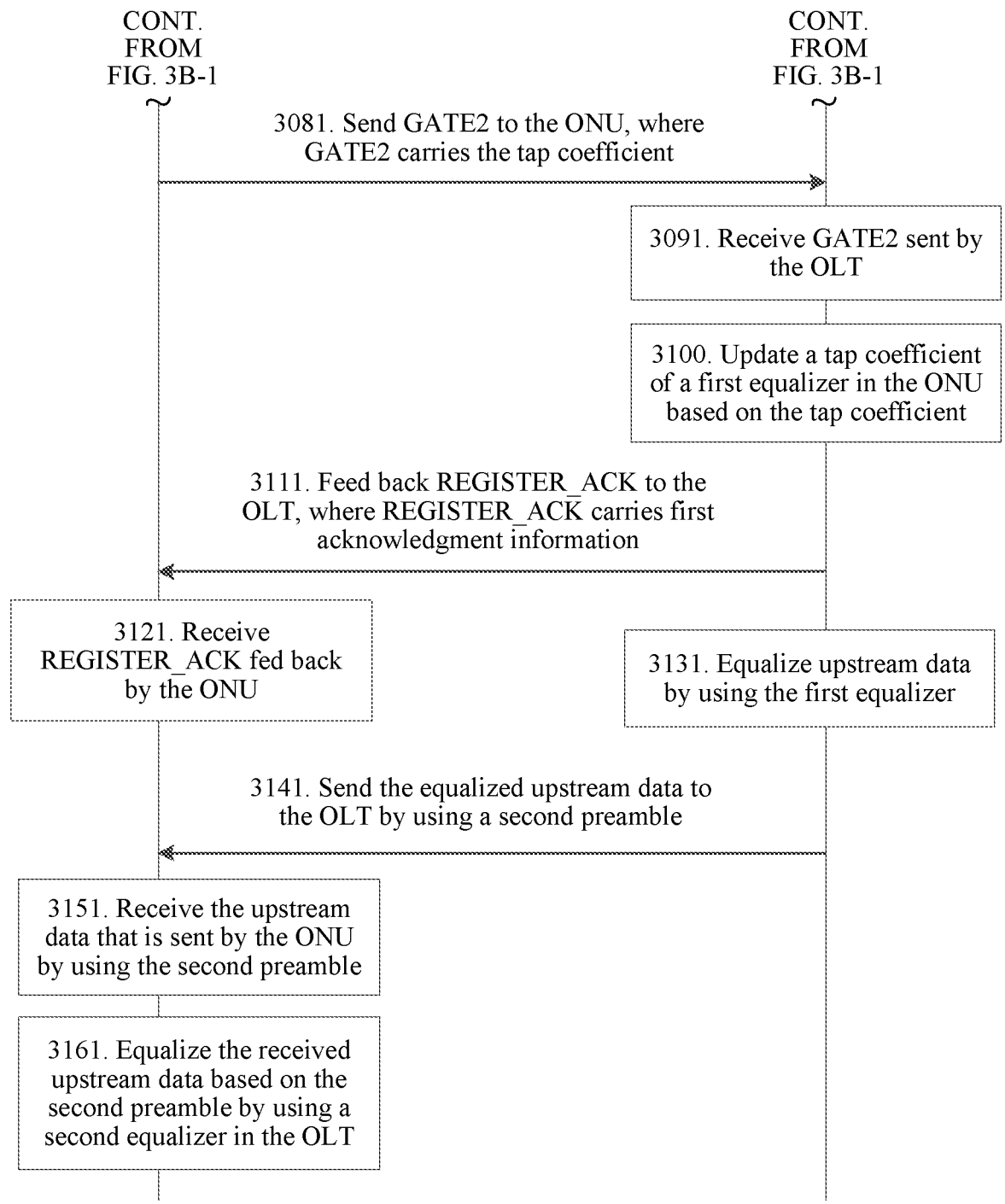

In the foregoing embodiment, the OLT sends the tap coefficient to the ONU by using REGISTER1 only for example. Optionally, the tap coefficient may alternatively be sent to the ONU in GATE2. In this case, referring to FIG. 3B-1 and FIG. 3B-2, step 306 to step 316 may be replaced with the following steps.

Step 3061: The OLT sends a first authorization acknowledgment message REGISTER1 to the ONU.

After the OLT receives REGISTER_REQ, the OLT sends, to the ONU, existing REGISTER1, namely, REGISTER1 carrying no tap coefficient.

In REGISTER1, a DA is an ONU MAC address, an SA is an OLT MAC address, and content is an LLID, an authorization time, and authorization waiting.

Step 3071: The ONU receives REGISTER1 sent by the OLT.

Step 3081: The OLT sends GATE2 to the ONU, where GATE2 carries the tap coefficient.

After receiving REGISTER_REQ, the OLT detects, based on the capability information in REGISTER_REQ, whether the ONU has the equalization capability, and if a detection result is that the ONU has the equalization capability, when sending GATE2, sends, to the ONU, GATE2 carrying the tap coefficient. In GATE2, a DA is the MAC control multicast address, an SA is the OLT MAC address, and content is authorization information.

Specifically, a pre-equalization coefficient information field is added through extension in the message GATE2. The pre-equalization coefficient information field is used to carry the tap coefficient.

For example, the pre-equalization coefficient information field is newly added in a $45^{th}$ byte to an $(X2)^{th}$ byte of the message GATE2, and the tap coefficient is carried in the pre-equalization coefficient information field. The $(X2)^{th}$ byte to a $60^{th}$ byte in the message GATE2 remain reserved, and X2 is an integer.

Step 3091: The ONU receives GATE2 sent by the OLT.

Step 3100: The ONU updates a tap coefficient of a first equalizer in the ONU based on the tap coefficient.

After receiving GATE2, the ONU extracts the tap coefficient carried in GATE2, and updates the tap coefficient of the first equalizer in the ONU by using the extracted tap coefficient.

Step 3111: The ONU feeds back acknowledgment message (REGISTER_ACK) to the OLT, where REGISTER_ACK carries first acknowledgment information.

In this embodiment, that step 3100 is performed before step 3111 is only an example. Optionally, step 3100 and step 3111 may be performed simultaneously, or step 3111 is performed before step 3100. This is not limited in this embodiment.

Step 3121: The OLT receives REGISTER_ACK fed back by the ONU.

Step 3131: The ONU equalizes upstream data by using the first equalizer.

Step 3141: The ONU sends the equalized upstream data to the OLT by using a second preamble.

Step 3151: The OLT receives the upstream data that is sent by the ONU by using the second preamble.

Step 3161: The OLT equalizes the received upstream data based on the second preamble by using a second equalizer in the OLT.

It should be noted that, step 3091 to step 3161 are similar to step 309 to step 316 in the foregoing embodiment, and details are not described herein again in this embodiment.

In addition, in the foregoing embodiment, after receiving the tap coefficient, when sending REGISTER_ACK to the OLT, the ONU sends, only for example, REGISTER_ACK carrying the first acknowledgment information. Optionally, the ONU may alternatively send existing REGISTER_ACK to the OLT. This is not limited in this embodiment.

The foregoing embodiments are described by using an example in which the upstream data equalization method is applied to the EPON system. During actual implementation, the upstream data equalization method may also be applied to a GPON system or an XG-PON system. Moreover, implementation methods are similar when the upstream data equalization method is applied to the GPON system and the XG-PON system, and therefore are described below together.

In addition, in the GPON system or the XG-PON system, a length and a pattern of a preamble are pre-configured by a designer in an OLT and delivered by the OLT to an ONU, and the OLT may deliver a length and a pattern of a first preamble and a length and a pattern of a second preamble to the ONU together or separately. Therefore, the two cases are separately described below in different embodiments.

Figures 1, 4A:
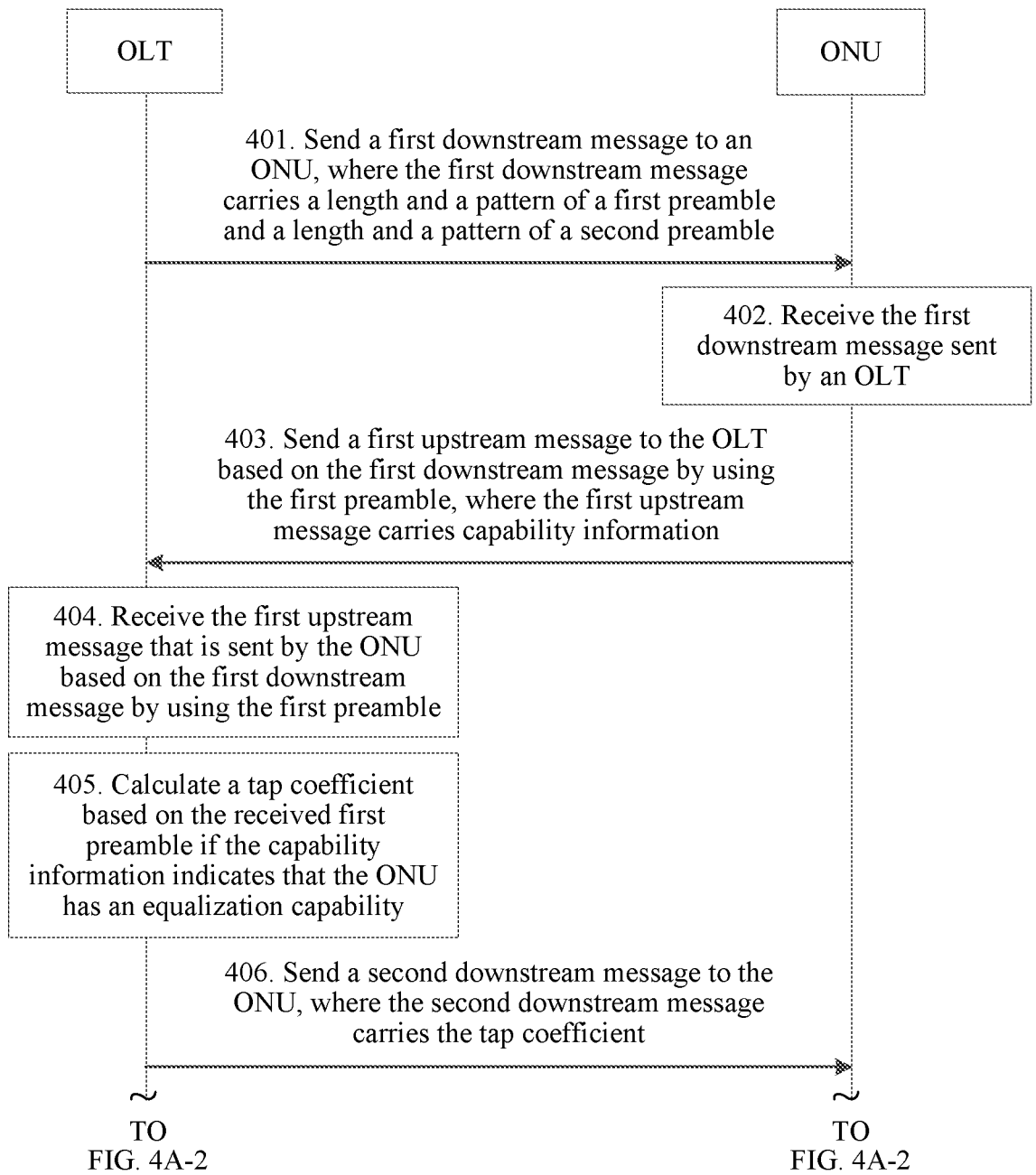
Figures 2, 4A:
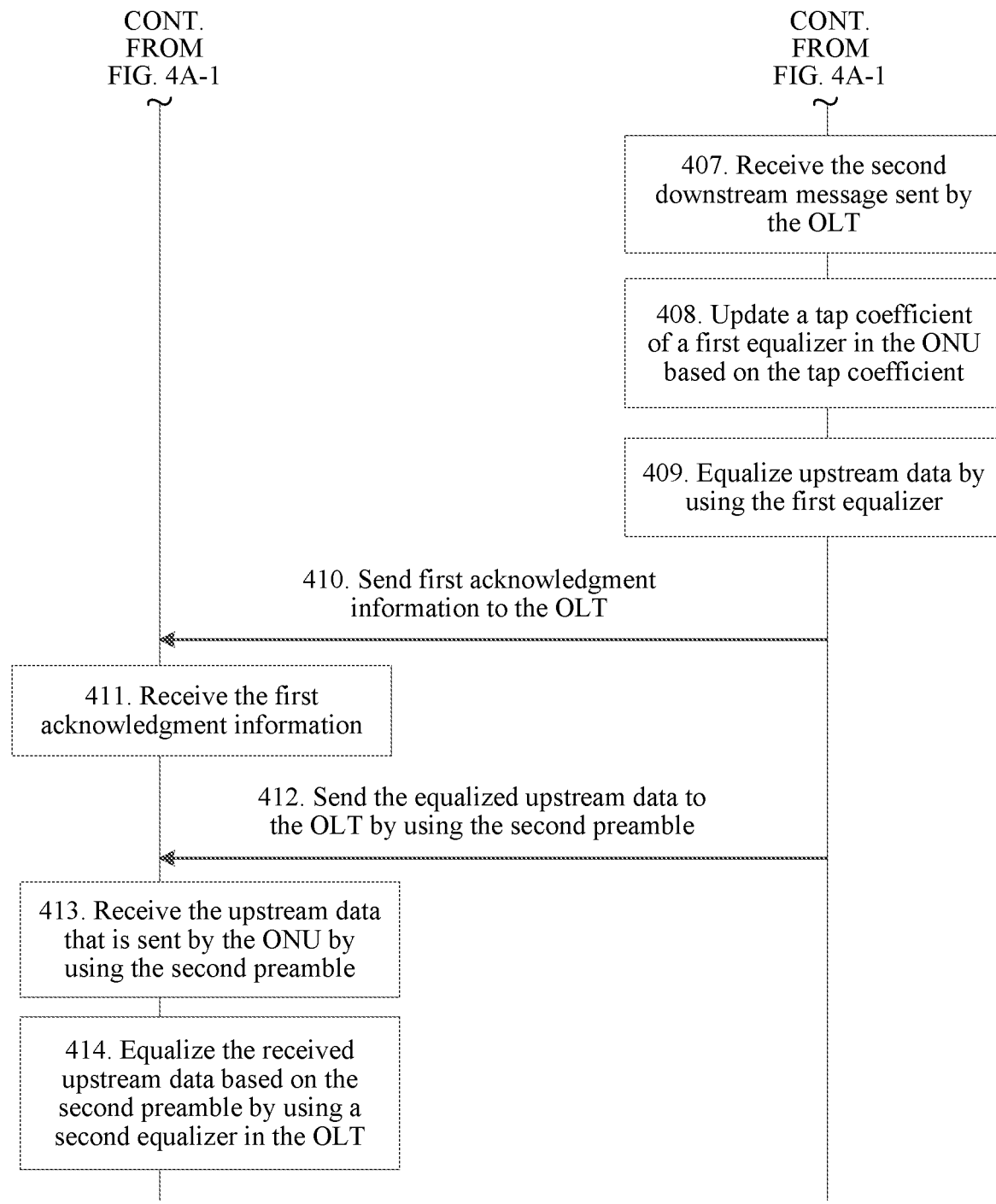

FIG. 4A-1 and FIG. 4A-2 are a method flowchart of an upstream data equalization method according to an embodiment of the present disclosure. This embodiment is described by using an example in which the upstream data equalization method is applied to the implementation environment shown in FIG. 1, and is applied to a GPON or an XG-PON system, and an OLT delivers a length and a pattern of a first preamble and a length and a pattern of a second preamble to an ONU together. As shown in FIG. 4A-1 and FIG. 4A-2, the upstream data equalization method may include the following steps.

Step 401: An OLT sends a first downstream message to an ONU, where the first downstream message carries a length and a pattern of a first preamble and a length and a pattern of a second preamble.

The first downstream message is a message in a process in which the ONU performs registration and gets online. Moreover, when the OLT is applied to a GPON system, the first downstream message is an upstream management message (Upstream_Overhead); or when the OLT is applied to an XG-PON system, the first downstream message is a parameter set message Profile.

Specifically, in the first downstream message, a DA is a MAC control multicast address, an SA is an OLT MAC address, and content includes the length and the pattern of the first preamble and the length and the pattern of the second preamble.

Step 402: The ONU receives the first downstream message sent by the OLT.

Step 403: The ONU sends a first upstream message to the OLT based on the first downstream message by using the first preamble, where the first upstream message carries capability information.

After the ONU receives the first downstream message, the ONU may send, to the OLT, Serial_Number_ONU carrying the capability information.

Specifically, a pre-equalization information field is newly added in a $17^{th}$ byte to an $(X3)^{th}$ byte of Serial_Number_ONU, and the capability information of the ONU is added through extension in the pre-equalization information field. For example, that the ONU has an equalization capability (ONU is pre-equalization capable) or that the ONU does not have the equalization capability (ONU is not pre-equalization capable) is added through extension in the pre-equalization information field. For another example, an identifier '1' indicating that the ONU has the equalization capability or an identifier '0' indicating that the ONU does not have the equalization capability is added through extension in the pre-equalization information field.

Optionally, because the first downstream message carries the length and the pattern of the first preamble, when sending Serial_Number_ONU, the ONU may send, based on the length and the pattern of the first preamble that are carried in the first downstream message, Serial_Number_ONU to the OLT by using the corresponding first preamble. A length and a pattern of the used first preamble are the length and the pattern that are carried in the first downstream message.

Optionally, in Serial_Number_ONU, a DA is the MAC control multicast address, an SA is an ONU MAC address, and content may further include an unassigned ONUID, a random delay time, and a vendor-specific serial number (VSSN). Details are not described herein in this embodiment.

It should be noted that, similar to the foregoing embodiment, when the ONU sends the first upstream message, a first equalizer in the ONU may be off. In other words, the equalization capability of the ONU is off. Optionally, the first equalizer may equalize upstream data by using a default tap coefficient. This is not limited in this embodiment.

Step 404: The OLT receives the first upstream message that is sent by the ONU based on the first downstream message by using the first preamble.

Step 405: The OLT calculates a tap coefficient based on the received first preamble if the capability information indicates that the ONU has an equalization capability.

After the OLT receives the first upstream message, the OLT may detect, based on the capability information carried in the first upstream message, whether the ONU has the equalization capability. If a detection result is that the ONU has the equalization capability, in this case, the OLT may calculate the tap coefficient based on the first preamble carrying a channel response.

A calculation method for calculating the tap coefficient by the OLT is similar to the calculation method in the foregoing embodiment, and details are not described herein again in this embodiment.

Step 406: The OLT sends a second downstream message to the ONU, where the second downstream message carries the tap coefficient.

After the OLT calculates the tap coefficient, the OLT may send, to the ONU, the second downstream message carrying the tap coefficient. The second downstream message is a message after the first upstream message when the ONU performs registration and gets online, and the second downstream message is an ONU identifier assignment message (Assign_ONU-ID), a ranging authorization message (Request_Registration), or a delay equalization message (Ranging_Time).

Specifically, a pre-equalization coefficient information field is added through extension in the second downstream message, and the pre-equalization coefficient information field is used to carry the tap coefficient.

Optionally, when the second downstream message is Assign_ONU-ID, the pre-equalization coefficient information field may be an information field added through extension in a $15^{th}$ byte to an $(X4)^{th}$ byte of Assign_ONU-ID. Moreover, in this case, the $(X4)^{th}$ byte to a $40^{th}$ byte in Assign_ONU-ID remain reserved. During actual implementation, Assign_ONU-ID may further include other content. For example, in Assign_ONU-ID, a DA is the MAC control multicast address, an SA is the OLT MAC address, and content further includes the ONU ID, the VSSN, and the like. Details are not described herein in this embodiment.

When the second downstream message is Request_Registration, the pre-equalization coefficient information field may be an information field added through extension in a fifth byte to an $(X5)^{th}$ byte of Request_Registration. Moreover, in this case, the $(X5)^{th}$ byte to a $40^{th}$ byte in Request_Registration remain reserved. During actual implementation, in Request_Registration, a DA is an ONU MAC control multicast address, an SA is the OLT MAC address, and content further includes the ONU ID.

When the second downstream message is Ranging_Time, the pre-equalization coefficient information field may be an information field added through extension in a $10^{th}$ byte to an $(X6)^{th}$ byte of Ranging_Time. Moreover, in this case, the $(X6)^{th}$ byte to a $40^{th}$ byte in Request_Registration remain reserved. During actual implementation, in Ranging_Time, a DA is the MAC control multicast address, an SA is the OLT MAC address, and content further includes an equalization delay field and an equalization delay value.

Step 407: The ONU receives the second downstream message sent by the OLT.

Step 408: The ONU updates a tap coefficient of a first equalizer in the ONU based on the tap coefficient.

The ONU includes the first equalizer. After receiving the second downstream message, the ONU extracts the tap coefficient carried in the second downstream message, and updates the tap coefficient of the first equalizer by using the extracted tap coefficient.

Step 409: The ONU equalizes upstream data by using the first equalizer.

Subsequently, when the ONU needs to send the upstream data, the ONU may first equalize the upstream data by using the first equalizer whose tap coefficient is updated.

Step 410: The ONU sends first acknowledgment information to the OLT.

The first acknowledgment information is a message after the second downstream message in the process in which the ONU performs registration and gets online. Specifically, because a ranging response message (Registration) does not include a reserved field in the process in which the ONU performs registration and gets online, the ONU may send a delay acknowledgment message (Acknowledge) carrying the first acknowledgment information.

Specifically, the ONU newly adds an echoed pre-equalization assignment field in Acknowledge, and adds the first acknowledgment information, for example, adds '1', in the echoed pre-equalization assignment field. The echoed pre-equalization assignment field may be in a sixth byte in Acknowledge.

Step 411: The OLT receives the first acknowledgment information.

Step 412: The ONU sends the equalized upstream data to the OLT by using the second preamble.

After equalizing the upstream data, the ONU sends the equalized upstream data to the OLT by using the second preamble. Specifically, the ONU may send, based on the length and the pattern of the second preamble that are carried in the first downstream message, the equalized upstream data to the OLT by using the second preamble. In other words, a length and a pattern of the used second preamble are the length and the pattern of the second preamble that are carried in the first downstream message.

Step 413: The OLT receives the upstream data that is sent by the ONU by using the second preamble.

Step 414: The OLT equalizes the received upstream data based on the second preamble by using a second equalizer in the OLT.

The OLT includes the second equalizer. After the OLT receives the upstream data sent by the ONU, the OLT may equalize, based on the second preamble carrying a channel response, the received upstream data by using the second equalizer.

Figure 4B:
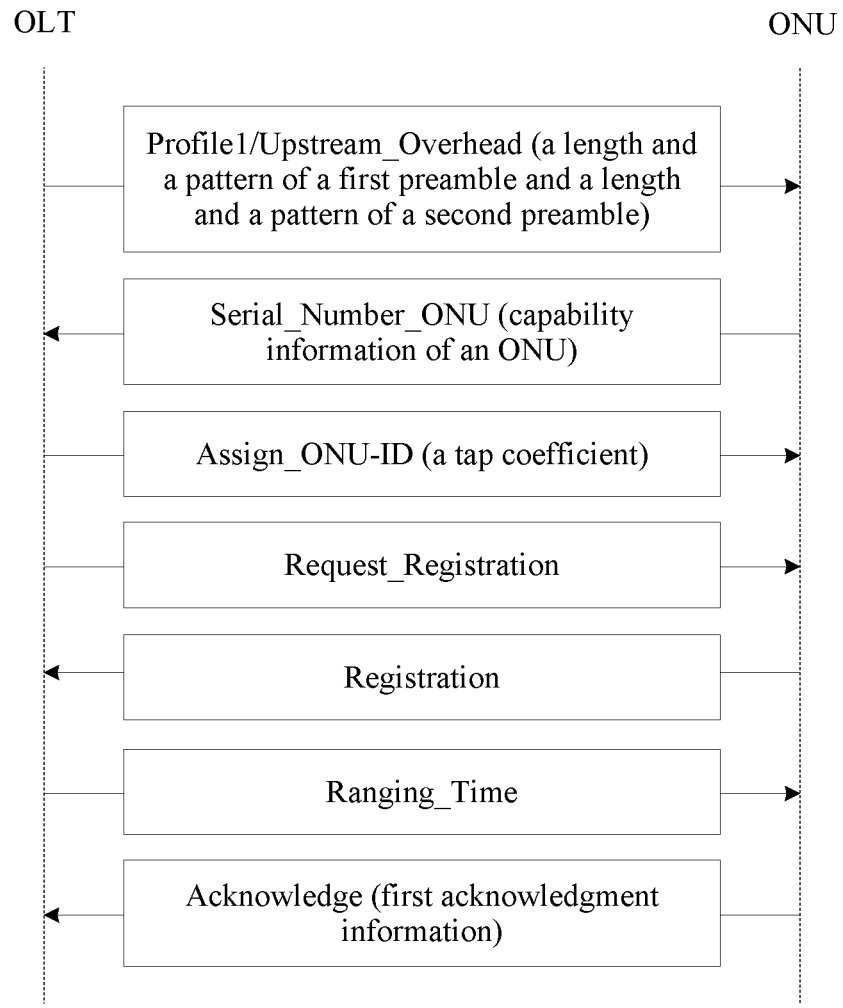
FIG. 4B, FIG. 4C, and FIG. 4D are sketches of an upstream data equalization method according to still another embodiment of the present disclosure.
Figure 4C:
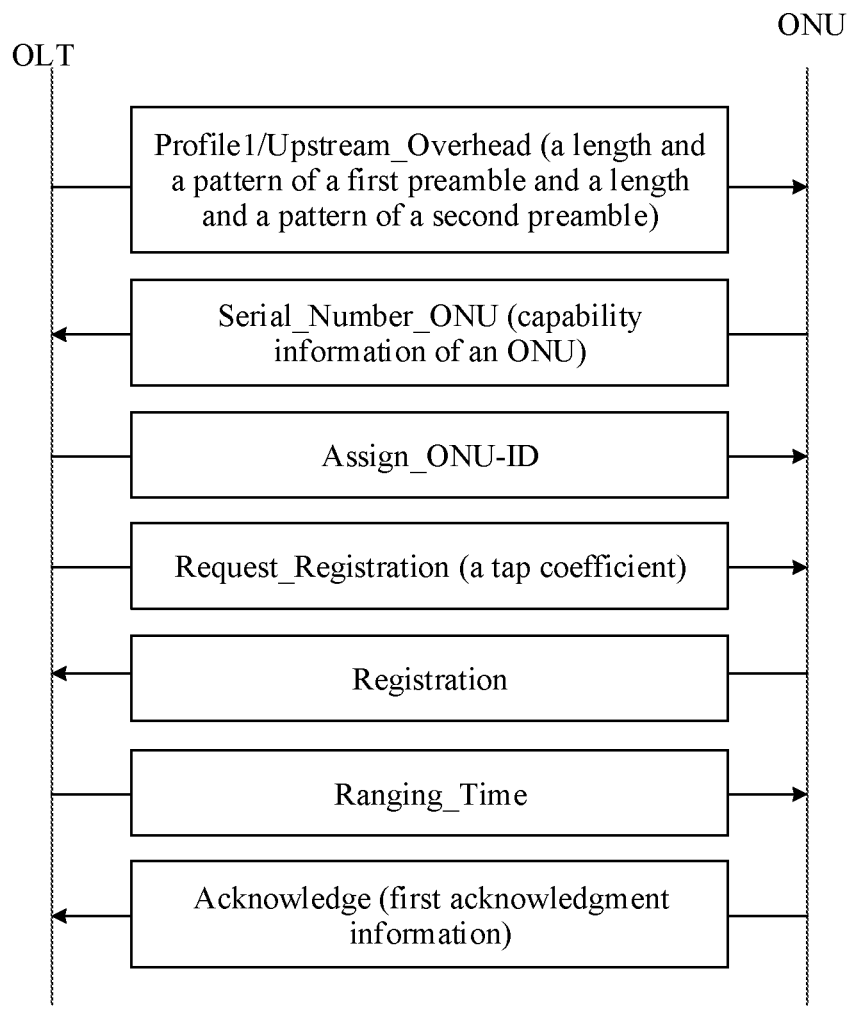
Figure 4D:
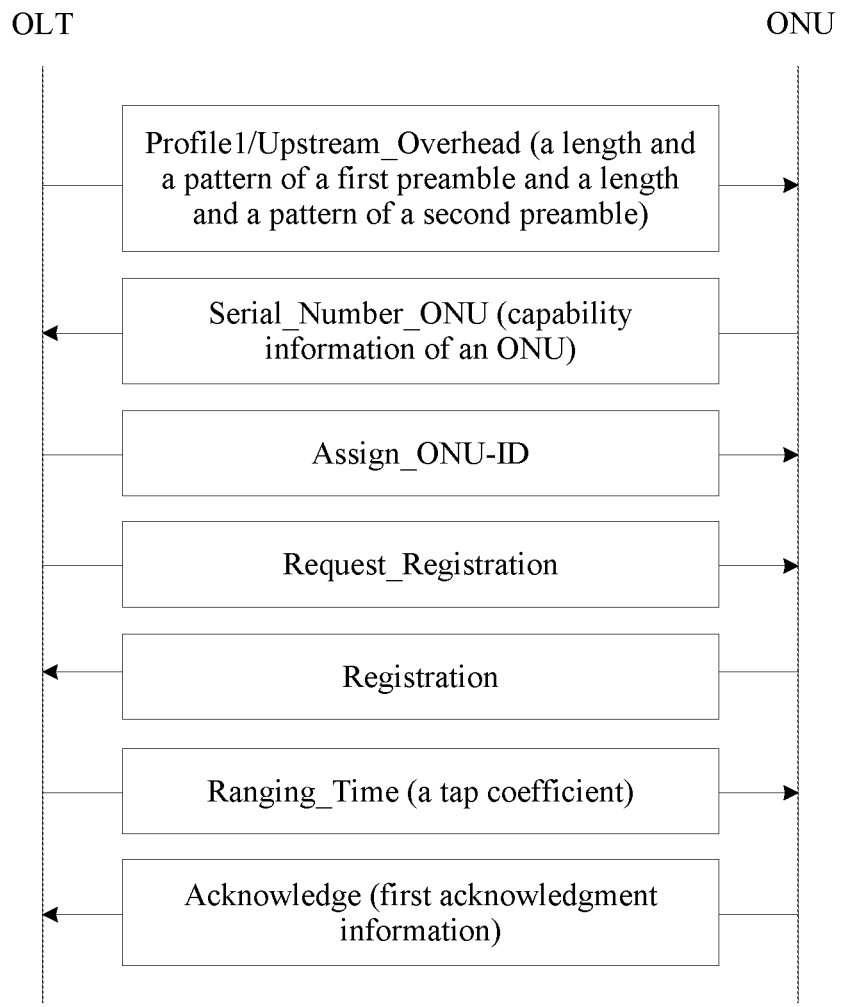

It should be noted that, the foregoing describes only steps related to this embodiment. During actual implementation, the upstream data equalization method may further include another step. Moreover, because the second downstream message may be Assign_ONU-ID, Request_Registration, or Ranging_Time, FIG. 4B, FIG. 4C, and FIG. 4D are respectively complete method flowcharts of the upstream data equalization method when the second downstream message is one of Assign_ONU-ID, Request_Registration, and Ranging_Time.

In conclusion, according to the upstream data equalization method provided in this embodiment, the ONU reports the capability information to the OLT by using the first preamble, so that the OLT may detect, based on the capability information, whether the ONU has the equalization capability, and when a detection result is that the ONU has the equalization capability, calculate the tap coefficient based on the received first preamble carrying a channel response, and feed back the tap coefficient to the ONU. The ONU updates the tap coefficient of the first equalizer in the ONU based on the received tap coefficient, and when subsequently sending the upstream data, sends the upstream data equalized by using the first equalizer to the OLT by using the relatively short second preamble. Subsequently, the OLT may equalize, by using the second equalizer, the upstream data based on the received second preamble carrying a channel response. Therefore, a problem of consuming specific upstream overheads in the prior art is resolved, and upstream overheads can be reduced.

Figures 1, 5A:
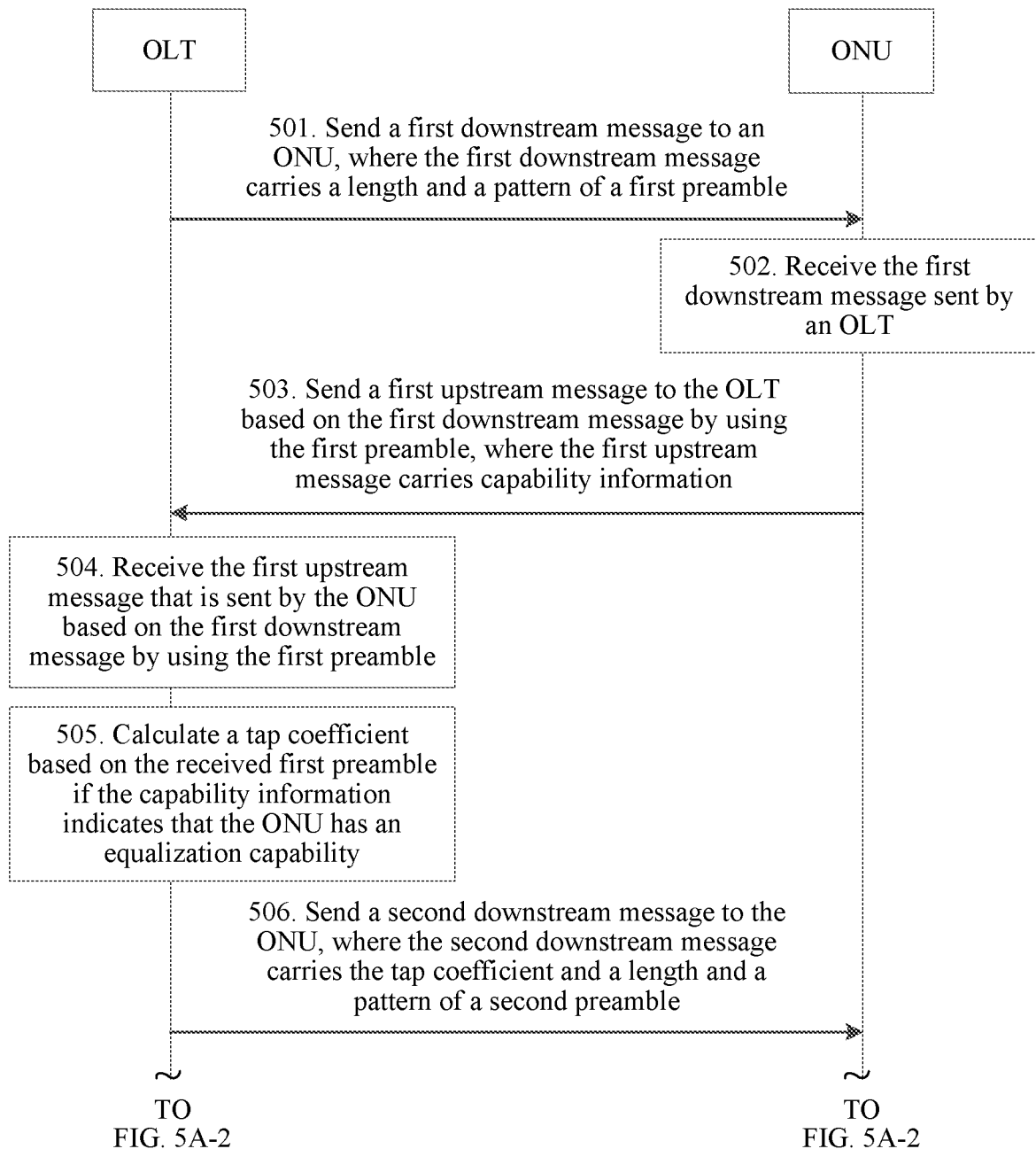
Figures 2, 5A:
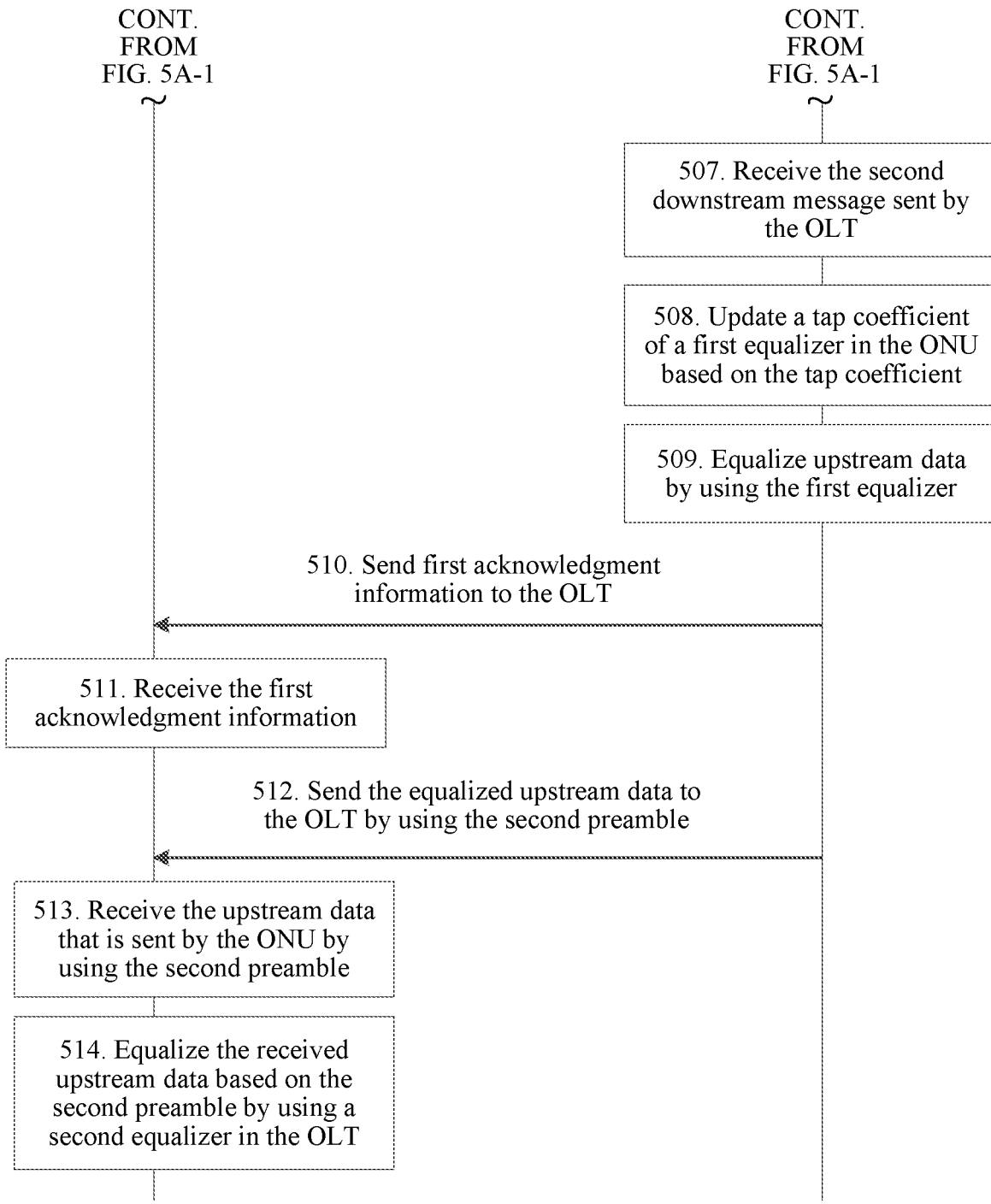

The foregoing embodiment is described by using an example in which the length and the pattern of the first preamble and the length and the pattern of the second preamble are sent to the ONU together. Optionally, the two may alternatively be sent to the ONU separately. In this case, referring to FIG. 5A-1 and FIG. 5A-2, the upstream data equalization method may include the following steps.

Step 501: An OLT sends a first downstream message to an ONU, where the first downstream message carries a length and a pattern of a first preamble.

This step is similar to step 401. A difference lies in that, in this embodiment, the first downstream message carries only the length and the pattern of the first preamble.

Step 502: The ONU receives the first downstream message sent by the OLT.

Step 503: The ONU sends a first upstream message to the OLT based on the first downstream message by using the first preamble, where the first upstream message carries capability information.

After the ONU receives the first downstream message, the ONU may send, to the OLT, Serial_Number_ONU carrying the capability information.

This step is similar to step 403, and details are not described herein again in this embodiment.

Step 504: The OLT receives the first upstream message that is sent by the ONU based on the first downstream message by using the first preamble.

Step 505: The OLT calculates a tap coefficient based on the received first preamble if the capability information indicates that the ONU has an equalization capability.

After the OLT receives the first upstream message, the OLT may detect, based on the capability information carried in the first upstream message, whether the ONU has the equalization capability. If a detection result is that the ONU has the equalization capability, in this case, the OLT may calculate the tap coefficient based on the first preamble carrying a channel response.

A calculation method for calculating the tap coefficient by the OLT is similar to the calculation method in the foregoing embodiment, and details are not described herein again in this embodiment.

Step 506: The OLT sends a second downstream message to the ONU, where the second downstream message carries the tap coefficient and a length and a pattern of a second preamble.

After the OLT calculates the tap coefficient, the OLT may send, to the ONU, the second downstream message carrying the tap coefficient. The second downstream message is a message after the first upstream message when the ONU performs registration and gets online, and the second downstream message is Assign_ONU-ID, Request_Registration, or Ranging_Time.

A difference from step 406 lies in that, in this embodiment, in addition to a pre-equalization coefficient information field, a preamble definition field may be further added through extension in the second downstream message, and the preamble definition field is used to carry the length and the pattern of the second preamble. Specifically, both the pre-equalization coefficient information field and the preamble definition field may occupy reserved fields in the second downstream message, and the reserved fields specifically occupied by the pre-equalization coefficient information field and the preamble definition field are not further described herein in this embodiment.

Step 507: The ONU receives the second downstream message sent by the OLT.

Step 508: The ONU updates a tap coefficient of a first equalizer in the ONU based on the tap coefficient.

The ONU includes the first equalizer. After receiving the second downstream message, the ONU extracts the tap coefficient carried in the second downstream message, and updates the tap coefficient of the first equalizer by using the extracted tap coefficient.

Step 509: The ONU equalizes upstream data by using the first equalizer.

Subsequently, when the ONU needs to send the upstream data, the ONU may first equalize the upstream data by using the first equalizer whose tap coefficient is updated.

Step 510: The ONU sends first acknowledgment information to the OLT.

The first acknowledgment information is a message after the second downstream message in a process in which the ONU performs registration and gets online. Specifically, because a ranging response message Registration does not include a reserved field in the process in which the ONU performs registration and gets online, the ONU may send a delay acknowledgment message (Acknowledge) carrying the first acknowledgment information.

During actual implementation, the ONU newly adds an echoed pre-equalization assignment field in Acknowledge, and adds the first acknowledgment information, for example, adds '1', in the echoed pre-equalization assignment field. The echoed pre-equalization assignment field may be in a sixth byte in Acknowledge.

Step 511: The OLT receives the first acknowledgment information.

Step 512: The ONU sends the equalized upstream data to the OLT by using the second preamble.

After equalizing the upstream data, the ONU sends the equalized upstream data to the OLT by using the second preamble. Specifically, the ONU may send, based on the length and the pattern of the second preamble that are carried in the second downstream message, the equalized upstream data to the OLT by using the second preamble. In other words, a length and a pattern of the used second preamble are the length and the pattern of the second preamble that are carried in the second downstream message.

Step 513: The OLT receives the upstream data that is sent by the ONU by using the second preamble.

Step 514: The OLT equalizes the received upstream data based on the second preamble by using a second equalizer in the OLT.

The OLT includes the second equalizer. After the OLT receives the upstream data sent by the ONU, the OLT may equalize, based on the second preamble carrying a channel response, the received upstream data by using the second equalizer.

Figure 5B:
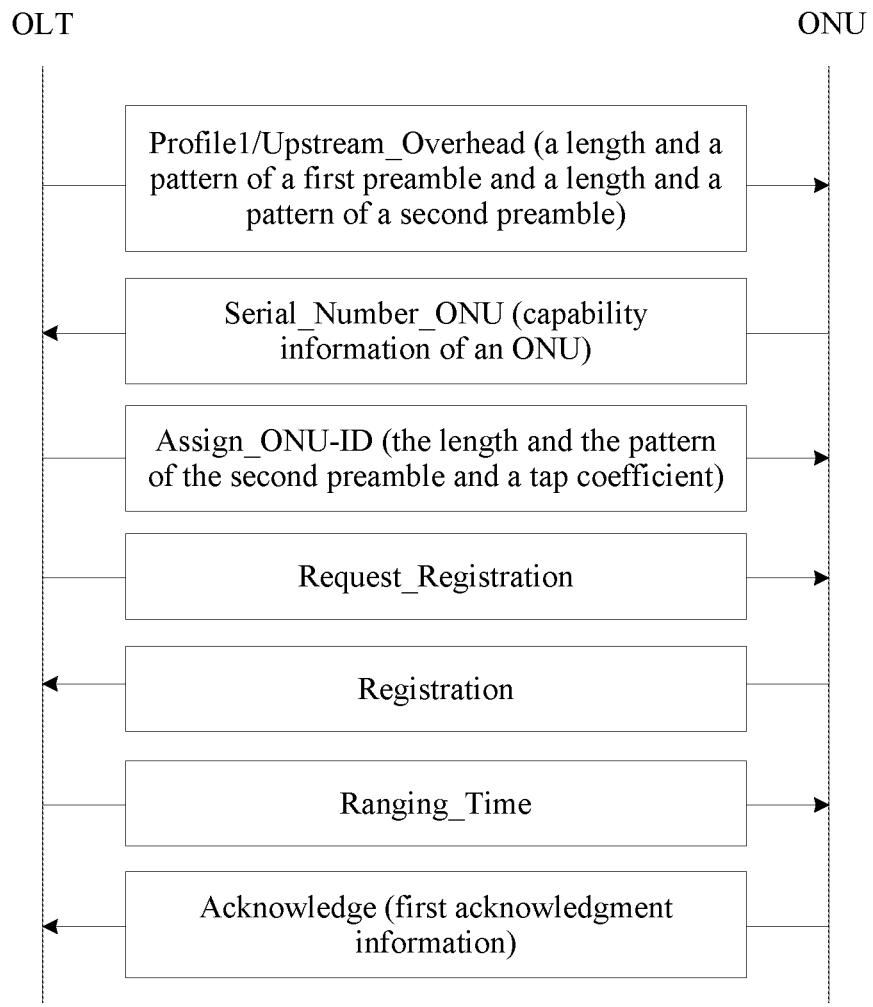
FIG. 5B, FIG. 5C, and FIG. 5D are sketches of an upstream data equalization method according to still another embodiment of the present disclosure.
Figure 5C:
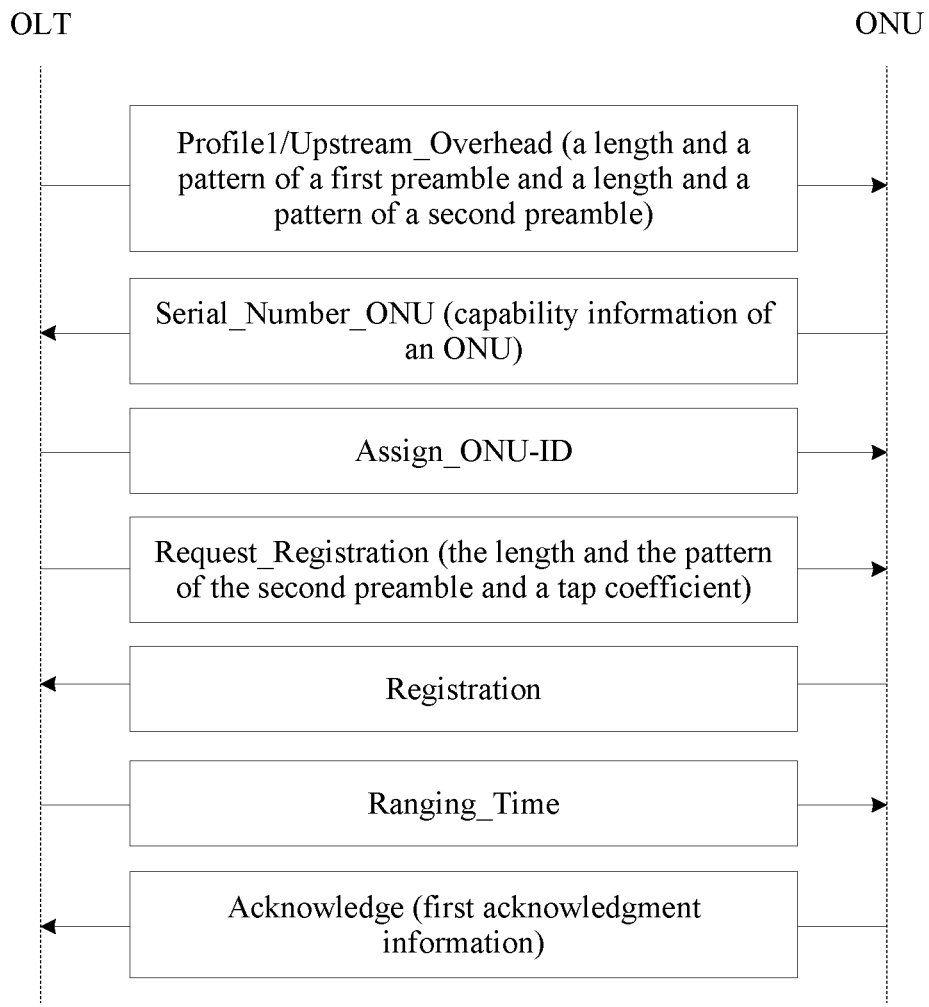
Figure 5D:
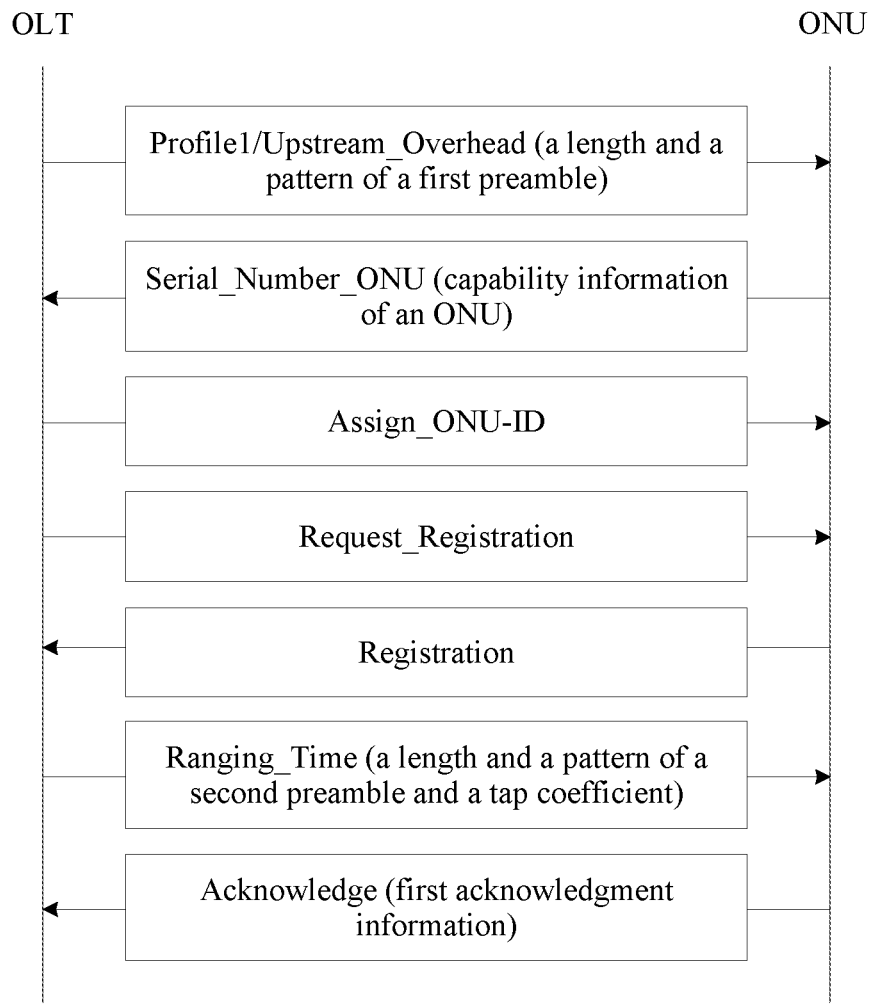

It should be noted that, the foregoing describes only steps related to this embodiment. During actual implementation, the upstream data equalization method may further include another step. Moreover, because the second downstream message may be Assign_ONU-ID, Request_Registration, or the delay equalization message Ranging_Time, FIG. 5B, FIG. 5C, and FIG. 5D are respectively complete method flowcharts of the upstream data equalization method when the second downstream message is one of Assign_ONU-ID, Request_Registration, and Ranging_Time.

In conclusion, according to the upstream data equalization method provided in this embodiment, the ONU reports the capability information to the OLT by using the first preamble, so that the OLT may detect, based on the capability information, whether the ONU has the equalization capability, and when a detection result is that the ONU has the equalization capability, calculate the tap coefficient based on the received first preamble carrying a channel response, and feed back the tap coefficient to the ONU. The ONU updates the tap coefficient of the first equalizer in the ONU based on the received tap coefficient, and when subsequently sending the upstream data, sends the upstream data equalized by using the first equalizer to the OLT by using the relatively short second preamble. Subsequently, the OLT may equalize, by using the second equalizer, the upstream data based on the received second preamble carrying a channel response. Therefore, a problem of consuming specific upstream overheads in the prior art is resolved, and upstream overheads can be reduced.

Figures 1, 6A:
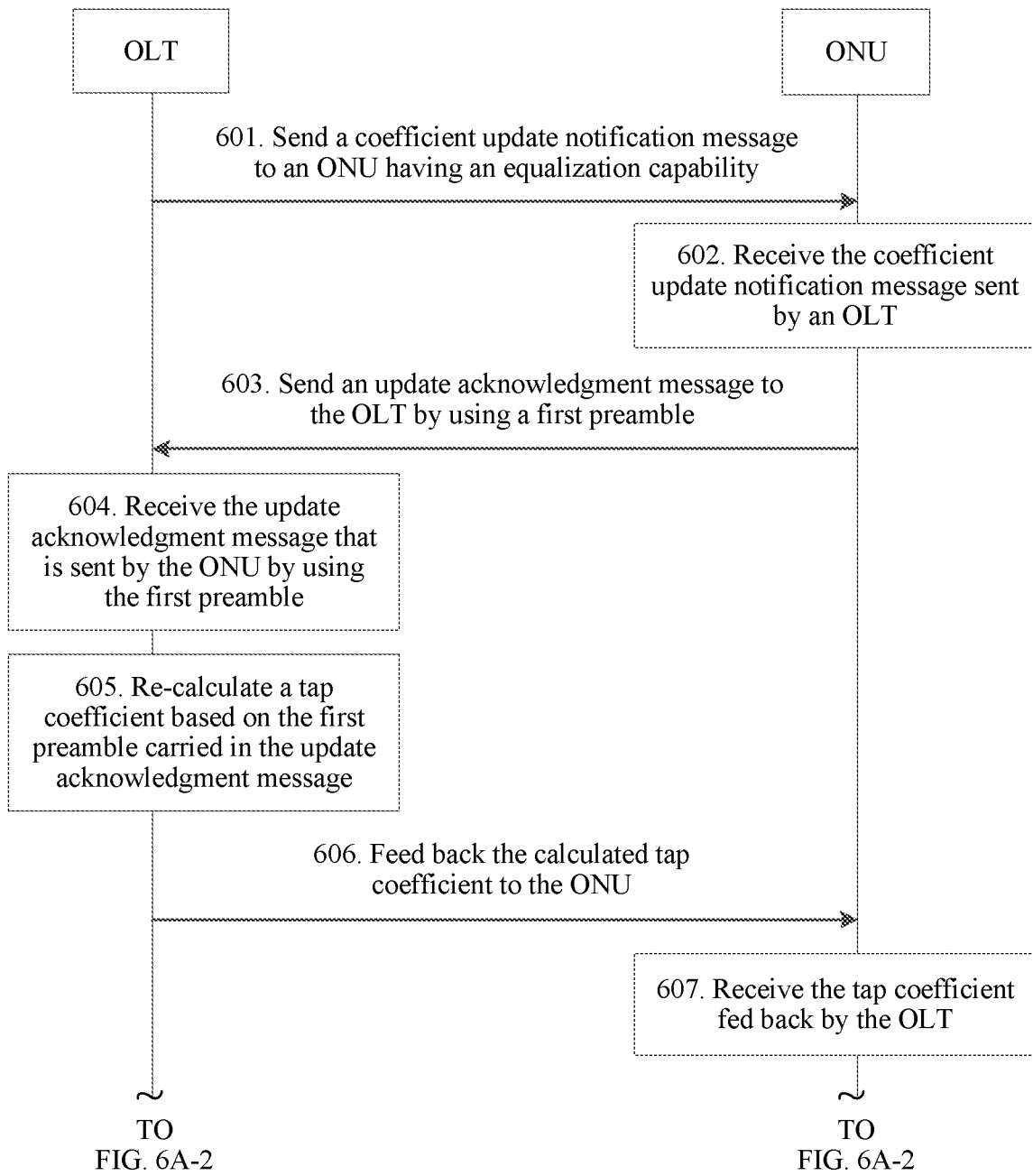
Figures 2, 6A:
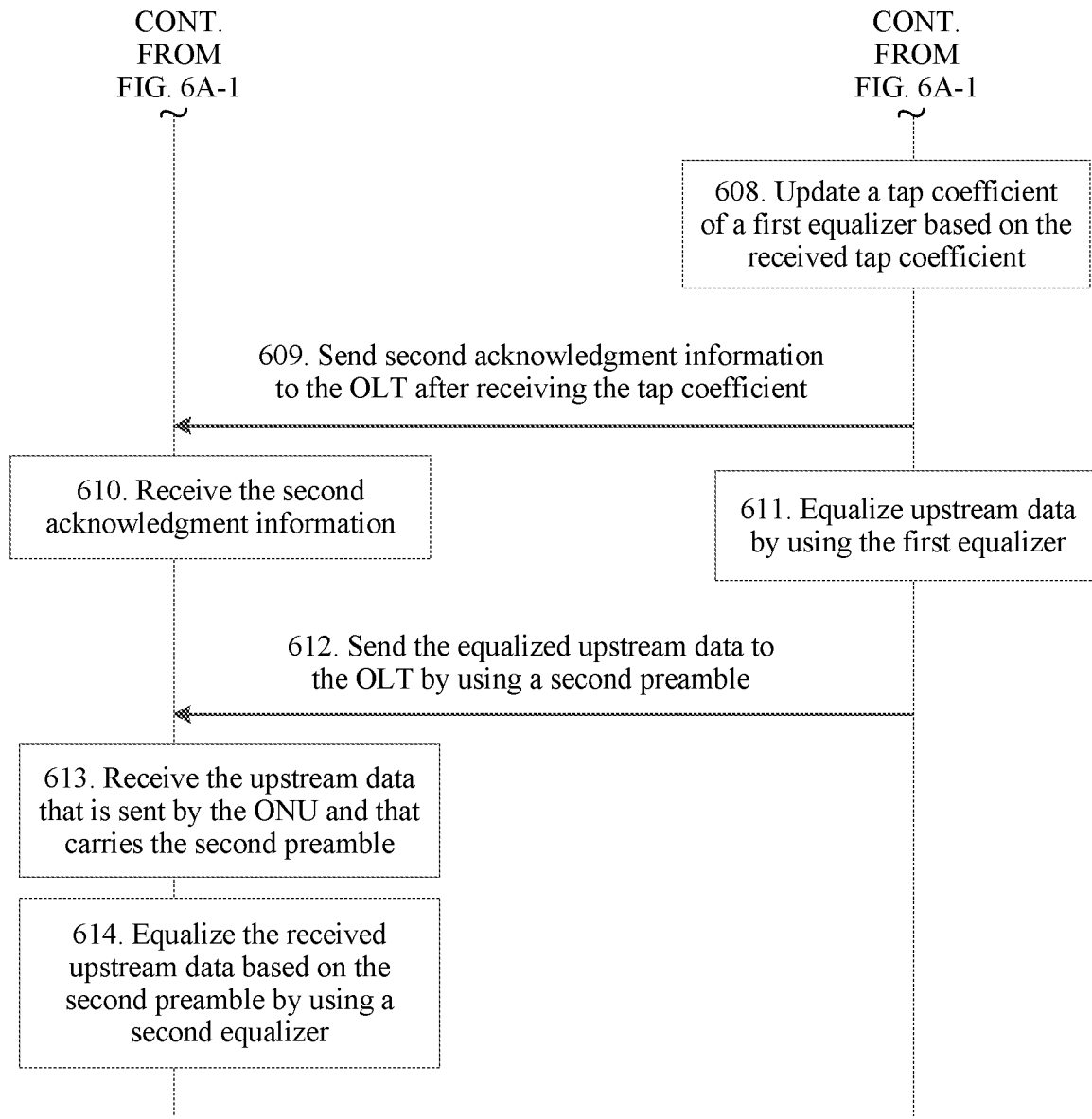

In the foregoing embodiments, because a channel response between the ONU and the OLT changes with time, to ensure accuracy, the OLT may update the tap coefficient. Specifically, referring to FIG. 6A-1 and FIG. 6A-2, the upstream data equalization method may further include the following steps.

Step 601: An OLT sends a coefficient update notification message to an ONU having an equalization capability.

Optionally, this step may include two implementations. First, the OLT may send, at a preset time interval, the coefficient update notification message to the ONU having the equalization capability. Second, the OLT obtains an indicator of communication between the OLT and the ONU having the equalization capability, and sends the coefficient update notification message to the ONU when the communication indicator meets a preset condition. The communication indicator includes a mean square error (MSE) or a bit error rate (BER), or includes both.

In the second implementation, when the communication indicator is the MSE, after receiving upstream data that is sent by using a second preamble by the ONU having the equalization capability, the OLT calculates an MSE based on the second preamble, and compares the calculated MSE with an MSE that is calculated based on a first preamble, and if a difference is greater than a first threshold, the OLT sends the coefficient update notification message to the ONU. When the communication indicator is the BER, after receiving upstream data that is sent by using a second preamble by the ONU having the equalization capability, the OLT calculates a BER of an entire received upstream burst block, and similar to the case of the MSE, the OLT may compare the calculated BER with a calculated BER of an entire upstream burst block that is sent by the ONU by using a first preamble, and if a difference is greater than a second threshold, send the coefficient update notification message to the ONU.

It should be noted that, in this embodiment, the OLT sends the coefficient update notification message in the foregoing two implementations only for example, and the communication indicator includes at least one of the foregoing two only for example. Optionally, the OLT may alternatively send the coefficient update notification message in another implementation. This is not limited in this embodiment.

Step 602: The ONU receives the coefficient update notification message sent by the OLT.

Step 603: The ONU sends an update acknowledgment message to the OLT by using a first preamble.

After the ONU receives the coefficient update notification message, the ONU may send the update acknowledgment message to the OLT by using the first preamble.

Step 604: The OLT receives the update acknowledgment message that is sent by the ONU by using the first preamble.

After receiving the update acknowledgment message, the OLT may correspondingly receive the first preamble carrying a channel response of a current channel.

Step 605: The OLT re-calculates a tap coefficient based on the first preamble carried in the update acknowledgment message.

This step is similar to the tap coefficient calculation method in the foregoing embodiment, and details are not described herein again.

Step 606: The OLT feeds back the calculated tap coefficient to the ONU.

Step 607: The ONU receives the tap coefficient fed back by the OLT.

Step 608: The ONU updates a tap coefficient of a first equalizer based on the received tap coefficient.

Step 609: The ONU sends second acknowledgment information to the OLT after receiving the tap coefficient.

Step 610: The OLT receives the second acknowledgment information.

Step 611: The ONU equalizes upstream data by using the first equalizer.

Step 612: The ONU sends the equalized upstream data to the OLT by using a second preamble.

Step 613: The OLT receives the upstream data that is sent by the ONU and that carries the second preamble.

Step 614: The OLT equalizes the received upstream data based on the second preamble by using a second equalizer.

The foregoing steps may be performed to update a tap coefficient in an EPON system, and may also be performed to update a tap coefficient in a GPON or an XG-PON system.

When the tap coefficient in the EPON system is updated, because in the EPON system, a downstream message is sent based on GATE, and an upstream message is sent based on REPORT, the tap coefficient may be updated based on GATE and REPORT.

Figure 6B:
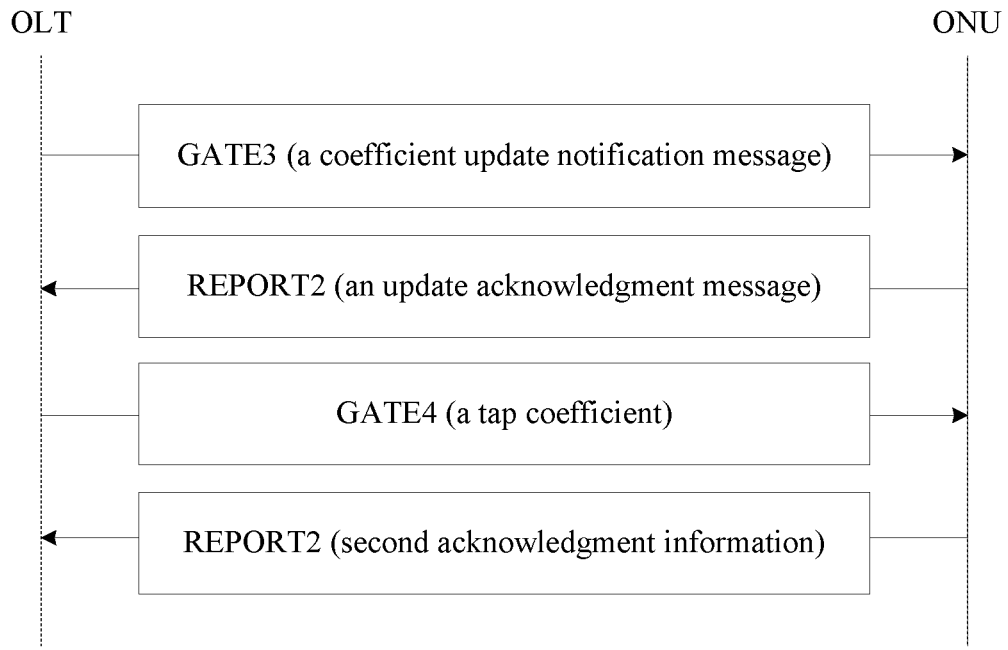
FIG. 6B and FIG. 6C are sketches of a tap coefficient update method according to still another embodiment of the present disclosure.

Referring to FIG. 6B, an OLT sends a coefficient update notification message to an ONU by using a third gating message GATE3, the ONU feeds back an update acknowledgment message by using a second report message (REPORT2), the OLT sends a calculated tap coefficient to the ONU by using a fourth gating message GATE4, and the ONU feeds back second acknowledgment information by using a third report message (REPORT3).

A pre-equalization update notice field is added through extension in GATE3, and the coefficient update notification message is carried in the pre-equalization update notice field. For example, that the OLT requests a pre-equalization update is carried, or that the OLT does not request a pre-equalization update (OLT does not request pre-equalization update) is carried. For another example, an identifier '1' indicating that a pre-equalization update is requested is carried, or an identifier '0' indicating that a pre-equalization update is not requested is carried. During actual implementation, the pre-equalization update notice field may be a $45^{th}$ byte in the message GATE2, and a $46^{th}$ byte to a $60^{th}$ byte remain reserved.

A pre-equalization coefficient information field is added through extension in GATE4, and the tap coefficient is carried in the pre-equalization coefficient information field. During actual implementation, the pre-equalization coefficient information field may be a $45^{th}$ byte to an $X^{th}$ byte in the message GATE3, and the $X^{th}$ byte to a $60^{th}$ byte remain reserved.

An echoed pre-equalization update notice field is added through extension in REPORT2, and the update acknowledgment message is carried in the echoed pre-equalization update notice field. During actual implementation, the echoed pre-equalization update notice field is after a report bitmap field.

An echoed pre-equalization assignment field is added through extension in REPORT3, and the second acknowledgment information is carried in the echoed pre-equalization assignment field. During actual implementation, the echoed pre-equalization assignment field may be after a report bitmap field.

Figure 6C:
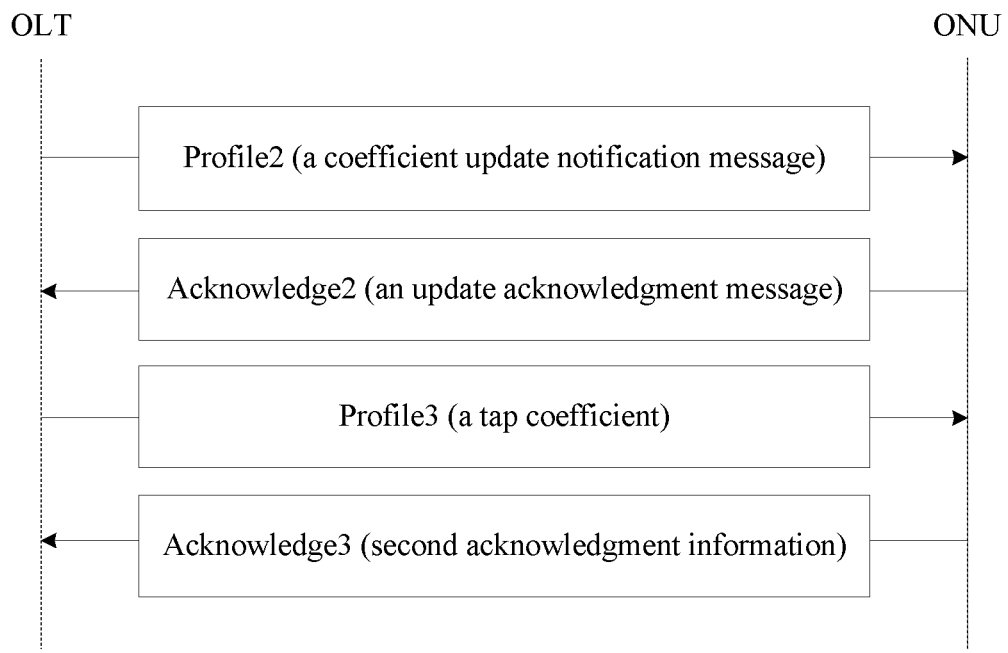

When the tap coefficient in the GPON system or the XG-PON system is updated, because implementations of the two are similar, updating the tap coefficient in the XG-PON system is used as an example in this embodiment. In the XG-PON system, an OLT sends a downstream message by using a message Profile, and receives an upstream message by using Acknowledge. Therefore, with reference to FIG. 6C, the OLT may send a coefficient update notification message to an ONU by using Profile2, the ONU feeds back an update acknowledgment message by using Acknowledge2, the OLT sends a re-calculated tap coefficient by using Profile3, and the ONU feeds back second acknowledgment information by using Acknowledge3.

Specifically, a pre-equalization update notice field is added through extension in Profile2, and the coefficient update notification message is carried in the pre-equalization update notice field. For example, that the OLT requests a pre-equalization update is carried, or that the OLT does not request a pre-equalization update is carried. For another example, an identifier '1' indicating that a pre-equalization update is requested is carried, or an identifier '0' indicating that a pre-equalization update is not requested is carried. During actual implementation, the pre-equalization update notice field may be a $34^{th}$ byte in the message Profile2, and the other reserved bytes remain reserved. Optionally, in addition to the pre-equalization update notice field, a preamble definition field may be further added through extension in Profile2, where the preamble definition field defines a length and a pattern of a first preamble, so that after receiving the coefficient update notification message, the ONU can send the update acknowledgment message by using the first preamble. Specifically, the preamble definition field may be in a $16^{th}$ byte in Profile2. This is not limited in this embodiment.

A pre-equalization coefficient information field is added through extension in Profile3, and the tap coefficient is carried in the pre-equalization coefficient information field. During actual implementation, the pre-equalization coefficient information field may be a $35^{th}$ byte to an $X^{th}$ byte in the message Profile3, and the $X^{th}$ byte to a $40^{th}$ byte remain reserved.

An echoed pre-equalization update notice field is added through extension in Acknowledge2, and the update acknowledgment message is carried in the echoed pre-equalization update notice field. During actual implementation, the echoed pre-equalization update notice field is in a sixth byte of Acknowledge2.

An echoed pre-equalization assignment field is added through extension in Acknowledge3, and the second acknowledgment information is carried in the echoed pre-equalization assignment field. During actual implementation, the echoed pre-equalization assignment field may be in a seventh byte of Acknowledge3. This is not limited in this embodiment.

It should be noted that, in this embodiment, the ONU feeds back, only for example, the second acknowledgment information to the OLT after receiving the updated tap coefficient sent by the OLT. Optionally, during actual implementation, the ONU may alternatively not feed back the second acknowledgment information. This is not limited in this embodiment.

In the foregoing embodiments, steps related to an OLT side may be separately implemented as an upstream data equalization method on the OLT side, and steps related to an ONU side may be separately implemented as a method on the ONU side.

Figure 7:
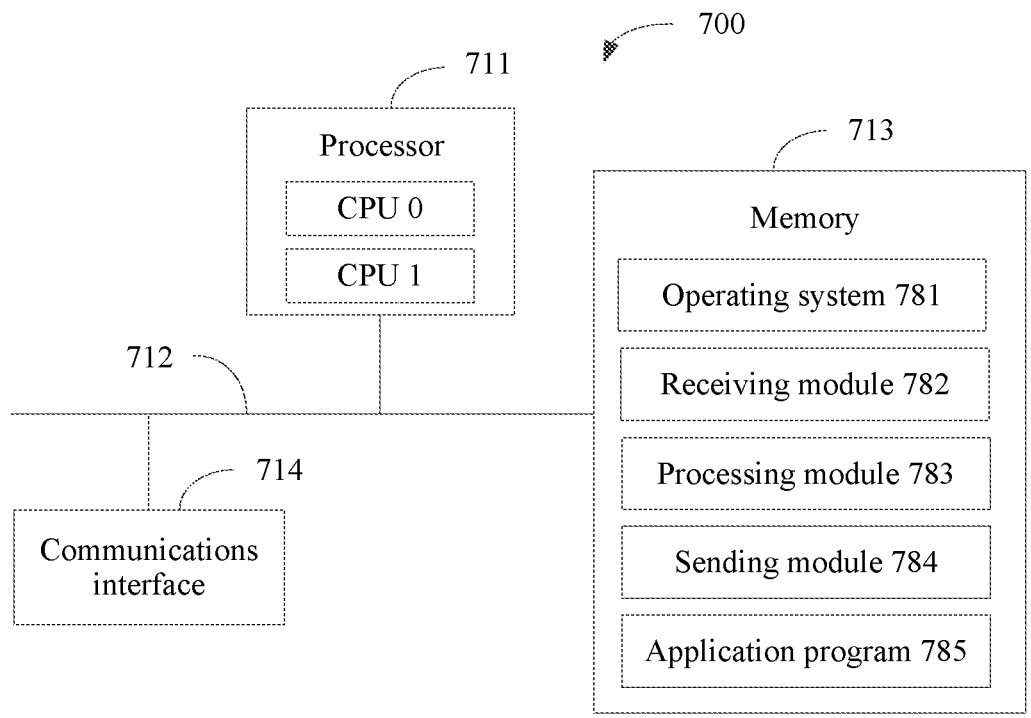
FIG. 7 is a schematic structural diagram of an upstream data equalization apparatus according to an embodiment of the present disclosure.

FIG. 7 is a schematic structural diagram of an upstream data equalization apparatus according to an example embodiment of the present disclosure. The upstream data equalization apparatus may be implemented as all or a part of an OLT. The OLT includes a processor 711, a communications bus 712, a memory 713, and a communications interface 714.

The processor 711 may include one or more central processing units (CPU). The processor 711 runs a software program and a module, to perform various function applications and service data processing.

The communications interface 714 may include a wired network interface, for example, an Ethernet interface, and may also include a wireless network interface. The communications interface 714 is configured to receive a data packet sent by an upper/lower-level device, and/or forward a data packet to the upper/lower-level device.

The memory 713 and the communications interface 714 are separately connected to the processor 711 by using the communications bus 712.

The memory 713 may be configured to store the software program and the module, where the software program and the module are executed by the processor 711. In addition, the memory 713 may further store various types of service data and user data.

In this embodiment of the present disclosure, the memory 713 stores an operating system 781, a receiving module 782, a processing module 783, a sending module 784, an application program 785 required by at least one other function, and the like. The processor 711 invokes modules stored in the memory 713 to perform the upstream data equalization method on the OLT side in the foregoing embodiments. In addition, the memory 713 may be implemented by any type of volatile or non-volatile storage device or a combination thereof.

It should be noted that, in the foregoing embodiment, the upstream data equalization apparatus is implemented as all or a part of the OLT only for example. Optionally, the apparatus may also be implemented as all or a part of an ONU. Moreover, when the apparatus is implemented as all or a part of the ONU, the processor 711 invokes modules stored in the memory 713 to perform the upstream data equalization method on the ONU side in the foregoing embodiments.

Figure 8:
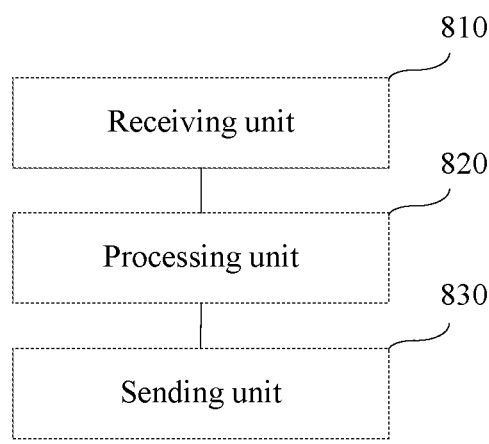
FIG. 8 is a schematic structural diagram of an upstream data equalization apparatus according to an embodiment of the present disclosure.

FIG. 8 is a schematic structural diagram of an upstream data equalization apparatus according to an embodiment of the present disclosure. In this embodiment, the upstream data equalization apparatus is applied to an OLT. As shown in FIG. 8, the upstream data equalization apparatus includes a receiving unit 810, a processing unit 820, and a sending unit 830.

The receiving unit 810 is configured to receive capability information that is sent by an optical network unit ONU by using a first preamble, where the capability information is used to indicate whether the ONU has an equalization capability.

The processing unit 820 is configured to calculate a tap coefficient based on the received first preamble if the capability information indicates that the ONU has the equalization capability.

The sending unit 830 is configured to send the tap coefficient to the ONU, where the ONU updates a tap coefficient of a first equalizer in the ONU based on the received tap coefficient, and when subsequently sending upstream data, sends, by using a second preamble, the upstream data equalized by using the first equalizer, and a length of the second preamble is less than a length of the first preamble.

The receiving unit 810 is further configured to receive the upstream data that is sent by the ONU by using the second preamble.

The processing unit 820 is further configured to equalize the received upstream data based on the second preamble by using a second equalizer in the OLT.

Optionally, the receiving unit 810 is further configured to: in a process in which the ONU performs registration and gets online, perform the step of receiving capability information that is sent by an optical network unit ONU by using a first preamble;

the processing unit 820 is further configured to: in the process in which the ONU performs registration and gets online, perform the step of calculating a tap coefficient based on the received first preamble if the capability information indicates that the ONU has the equalization capability; and the sending unit 830 is further configured to: in the process in which the ONU performs registration and gets online, perform the step of sending the tap coefficient to the ONU.

Optionally, the OLT is applied to an Ethernet passive optical network EPON system; the receiving unit 810 is further configured to receive a registration request message (REGISTER_REQ) that is sent by the ONU by using the default first preamble, where REGISTER_REQ carries the capability information; and the sending unit 830 is further configured to send a first authorization acknowledgment message (REGISTER1) to the ONU, where REGISTER1 carries the tap coefficient; or send a second authorization acknowledgment message (GATE2) to the ONU, where GATE2 carries the tap coefficient.

Optionally, the OLT is applied to a gigabit-capable passive optical network GPON system or an XG-PON system;

the sending unit 830 is further configured to send a first downstream message to the ONU, where the first downstream message carries the length and a pattern of the first preamble and the length and a pattern of the second preamble; and when the OLT is applied to the GPON system, the first downstream message is an upstream management message (Upstream_Overhead); or when the OLT is applied to the XG-PON system, the first downstream message is a parameter set message (Profile);

the receiving unit 810 is further configured to receive a first upstream message that is sent by the ONU based on the first downstream message by using the first preamble, where the first upstream message carries the capability information, the first upstream message is a message after the first downstream message when the ONU performs registration and gets online, and the first upstream message is an ONU serial number message (Serial_Number_ONU); and the sending unit 830 is further configured to send a second downstream message to the ONU, where the second downstream message carries the tap coefficient, the second downstream message is a message after the first upstream message when the ONU performs registration and gets online, and the second downstream message is an ONU identifier assignment message (Assign_ONU-ID), a ranging authorization message (Request_Registration), or a delay equalization message (Ranging_Time).

Optionally, the OLT is applied to a gigabit-capable passive optical network GPON system or an XG-PON system;

the sending unit 830 is further configured to send a first downstream message to the ONU, where the first downstream message carries the length and a pattern of the first preamble; and when the OLT is applied to the GPON system, the first downstream message is an upstream management message (Upstream_Overhead); or when the OLT is applied to the XG-PON system, the first downstream message is a parameter set message (Profile);

the receiving unit 810 is further configured to receive a first upstream message that is sent by the ONU based on the first downstream message by using the first preamble, where the first upstream message carries the capability information, the first upstream message is a message after the first downstream message when the ONU performs registration and gets online, and the first upstream message is an ONU serial number message (Serial_Number_ONU); and the sending unit 830 is further configured to send a second downstream message to the ONU, where the second downstream message carries the tap coefficient and the length and a pattern of the second preamble, the second downstream message is a message after the first upstream message when the ONU performs registration and gets online, and the second downstream message is an ONU identifier assignment message (Assign_ONU-ID), a ranging authorization message (Request_Registration), or a delay equalization message (Ranging_Time).

Optionally, the apparatus further includes:

the sending unit 830 is further configured to send a coefficient update notification message to the ONU having the equalization capability;

the receiving unit 810 is further configured to receive an update acknowledgment message that is sent by the ONU by using the first preamble;

the processing unit 820 is further configured to re-calculate the tap coefficient based on the first preamble carried in the update acknowledgment message;

the sending unit 830 is further configured to feed back the calculated tap coefficient to the ONU, where the tap coefficient is used to instruct the ONU to update the tap coefficient of the first equalizer, and when subsequently sending upstream data, send, by using the second preamble, the upstream data equalized by using the first equalizer;

the receiving unit 810 is further configured to receive the upstream data that is sent by the ONU and that carries the second preamble; and the processing unit 820 is further configured to equalize the received upstream data based on the second preamble by using the second equalizer.

In conclusion, the upstream data equalization apparatus provided in this embodiment receives the capability information that is reported by the ONU by using the first preamble, detects, based on the capability information, whether the ONU has the equalization capability, and when a detection result is that the ONU has the equalization capability, calculates the tap coefficient based on the received first preamble carrying a channel response, and feeds back the tap coefficient to the ONU. The ONU updates the tap coefficient of the first equalizer in the ONU based on the received tap coefficient, and when subsequently sending the upstream data, sends the upstream data equalized by using the first equalizer to the OLT by using the relatively short second preamble. Subsequently, the OLT may equalize, by using the second equalizer, the upstream data based on the received second preamble carrying a channel response. Therefore, a problem of consuming specific upstream overheads in the prior art is resolved, and upstream overheads can be reduced.

The tap coefficient of the first equalizer in the ONU is set when the ONU performs registration and gets online, so that the ONU can subsequently send the upstream data by using the relatively short second preamble, thereby reducing upstream overheads.

The tap coefficient of the first equalizer in the ONU is updated, so that after the ONU sends the equalized upstream data to the OLT, the OLT can obtain accurate upstream data, thereby ensuring accuracy.

Figure 9:
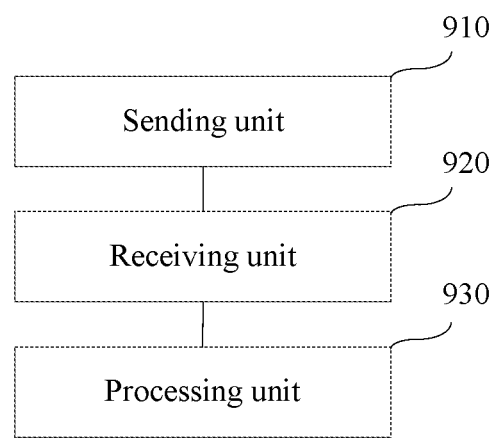
FIG. 9 is a schematic structural diagram of an upstream data equalization apparatus according to another embodiment of the present disclosure.

FIG. 9 is a schematic structural diagram of an upstream data equalization apparatus according to an embodiment of the present disclosure. In this embodiment, the upstream data equalization apparatus is applied to an ONU. As shown in FIG. 9, the upstream data equalization apparatus includes a sending unit 910, a receiving unit 920, and a processing unit 930.

The sending unit 910 is configured to send capability information of the ONU to an optical line terminal OLT by using a first preamble, where the capability information is used to indicate whether the ONU has an equalization capability, and the OLT is configured to: when the capability information indicates that the ONU has the equalization capability, calculate a tap coefficient based on the received first preamble, and feed back the tap coefficient.

The receiving unit 920 is configured to receive the tap coefficient fed back by the OLT.

The processing unit 930 is configured to update a tap coefficient of a first equalizer in the ONU based on the tap coefficient.

The processing unit 930 is further configured to equalize upstream data by using the first equalizer.

The sending unit 910 is further configured to send the equalized upstream data to the OLT by using a second preamble, where the OLT equalizes the received upstream data based on the second preamble by using a second equalizer in the OLT, and a length of the second preamble is less than a length of the first preamble.

Optionally, the sending unit 910 is further configured to: in a process in which the ONU performs registration and gets online, perform the step of sending capability information of the ONU to an optical line terminal OLT by using a first preamble; and the receiving unit 920 is further configured to: in the process in which the ONU performs registration and gets online, perform the step of receiving the tap coefficient fed back by the OLT.

Optionally, the ONU is applied to an Ethernet passive optical network EPON system;

the sending unit 910 is further configured to send a registration request message (REGISTER_REQ) to the OLT by using the default first preamble, where REGISTER_REQ carries the capability information; and the receiving unit 920 is further configured to receive a first authorization acknowledgment message (REGISTER1) sent by the OLT, where REGISTER1 carries the tap coefficient; or receive a second authorization acknowledgment message (GATE2) sent by the OLT, where GATE2 carries the tap coefficient.

Optionally, the ONU is applied to a gigabit-capable passive optical network GPON system or an XG-PON system;

the receiving unit 920 is further configured to receive a first downstream message sent by the OLT, where the first downstream message carries the length and a pattern of the first preamble and the length and a pattern of the second preamble; and when the ONU is applied to the GPON system, the first downstream message is an upstream management message (Upstream_Overhead); or when the ONU is applied to the XG-PON system, the first downstream message is a parameter set message Profile;

the sending unit 910 is further configured to send a first upstream message to the OLT based on the first downstream message by using the first preamble, where the first upstream message carries the capability information, the first upstream message is a message after the first downstream message when the ONU performs registration and gets online, and the first upstream message is an ONU serial number message (Serial_Number_ONU) or a ranging response message (Registration); and the receiving unit 920 is further configured to receive a second downstream message sent by the OLT, where the second downstream message carries the tap coefficient, the second downstream message is a message after the first upstream message when the ONU performs registration and gets online, and the second downstream message is an ONU identifier assignment message (Assign_ONU-ID), a ranging authorization message (Request_Registration), or a delay equalization message (Ranging_Time).

Optionally, the ONU is applied to a gigabit-capable passive optical network GPON system or an XG-PON system;

the receiving unit 920 is further configured to receive a first downstream message sent by the OLT, where the first downstream message carries the length and a pattern of the first preamble; and when the ONU is applied to the GPON system, the first downstream message is an upstream management message (Upstream_Overhead); or when the ONU is applied to the XG-PON system, the first downstream message is a parameter set message (Profile);

the sending unit 910 is further configured to send a first upstream message to the OLT based on the first downstream message by using the first preamble, where the first upstream message carries the capability information, the first upstream message is a message after the first downstream message when the ONU performs registration and gets online, and the first upstream message is an ONU serial number message (Serial_Number_ONU) or a ranging response message (Registration); and the receiving unit 920 is further configured to receive a second downstream message sent by the OLT, where the second downstream message carries the tap coefficient and the length and a pattern of the second preamble, the second downstream message is a message after the first upstream message when the ONU performs registration and gets online, and the second downstream message is an ONU identifier assignment message (Assign_ONU-ID), a ranging authorization message (Request_Registration), or a delay equalization message (Ranging_Time).

Optionally, the apparatus further includes:

the receiving unit 920 is further configured to receive a coefficient update notification message sent by the OLT;

the sending unit 910 is further configured to send an update acknowledgment message to the OLT by using the first preamble, where the OLT re-calculates the tap coefficient based on the first preamble in the received update acknowledgement message, and feeds back the tap coefficient;

the receiving unit 920 is further configured to receive the tap coefficient fed back by the OLT;

the processing unit 930 is further configured to update the tap coefficient of the first equalizer based on the received tap coefficient;

the processing unit 930 is further configured to equalize upstream data by using the first equalizer; and the sending unit 910 is further configured to send the equalized upstream data to the OLT by using the second preamble, where the OLT equalizes the received upstream data based on the second preamble, and the length of the second preamble is less than the length of the first preamble.

In conclusion, the upstream data equalization apparatus provided in this embodiment reports the capability information to the OLT by using the first preamble, so that the OLT can detect, based on the capability information, whether the ONU has the equalization capability, and when a detection result is that the ONU has the equalization capability, calculate the tap coefficient based on the received first preamble carrying a channel response, and feed back the tap coefficient to the ONU. The ONU updates the tap coefficient of the first equalizer in the ONU based on the received tap coefficient, and when subsequently sending the upstream data, sends the upstream data equalized by using the first equalizer to the OLT by using the relatively short second preamble. Subsequently, the OLT may equalize, by using the second equalizer, the upstream data based on the received second preamble carrying a channel response. Therefore, a problem of consuming specific upstream overheads in the prior art is resolved, and upstream overheads can be reduced.

The tap coefficient of the first equalizer in the ONU is set when the ONU performs registration and gets online, so that the ONU can subsequently send the upstream data by using the relatively short second preamble, thereby reducing upstream overheads.

The tap coefficient of the first equalizer in the ONU is updated, so that after the ONU sends the equalized upstream data to the OLT, the OLT can obtain accurate upstream data, thereby ensuring accuracy.

Figure 10:
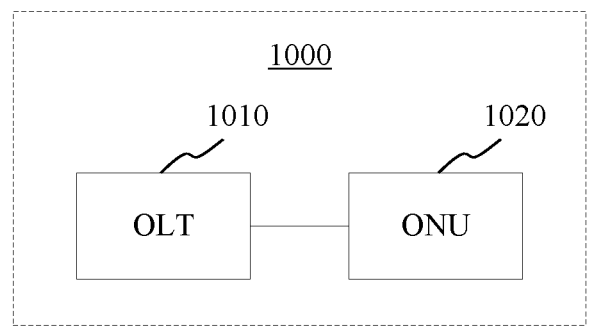
FIG. 10 is a schematic structural diagram of an upstream data equalization system according to an embodiment of the present disclosure.

FIG. 10 is a schematic structural diagram of an upstream data equalization system according to an embodiment of the present disclosure. As shown in FIG. 10, the upstream data equalization system 1000 may include an OLT 1010 and an ONU 1020 connected to the OLT 1010.

The OLT 1010 may be the OLT shown in FIG. 1; and the ONU 1020 may be the ONU shown in FIG. 1; or the OLT 1010 may include the upstream data equalization apparatus shown in FIG. 8; and the ONU 1020 may include the upstream data equalization apparatus shown in FIG. 9.

In conclusion, in the upstream data equalization system provided in this embodiment, the ONU reports the capability information to the OLT by using the first preamble, so that the OLT can detect, based on the capability information, whether the ONU has the equalization capability, and when a detection result is that the ONU has the equalization capability, calculate the tap coefficient based on the received first preamble carrying a channel response, and feed back the tap coefficient to the ONU. The ONU updates the tap coefficient of the first equalizer in the ONU based on the received tap coefficient, and when subsequently sending the upstream data, sends the upstream data equalized by using the first equalizer to the OLT by using the relatively short second preamble. Subsequently, the OLT may equalize, by using the second equalizer, the upstream data based on the received second preamble carrying a channel response. Therefore, a problem of consuming specific upstream overheads in the prior art is resolved, and upstream overheads can be reduced.

The tap coefficient of the first equalizer in the ONU is set when the ONU performs registration and gets online, so that the ONU can subsequently send the upstream data by using the relatively short second preamble, thereby reducing upstream overheads.

The tap coefficient of the first equalizer in the ONU is updated, so that after the ONU sends the equalized upstream data to the OLT, the OLT can obtain accurate upstream data, thereby ensuring accuracy.

It should be understood that, unless the context clearly supports an exception, a single form "one" ("a", "an", "the") used herein also intends to include a plural form. It should be further understood that "and/or" used herein intends to include any and all possible combinations of one or more correlated items that are listed.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely examples of embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. An upstream data equalization method applied to an optical line terminal (OLT), the method comprising:
   receiving capability information that is sent by an optical network unit (ONU) by using a first preamble, the capability information for indicating whether the ONU has an equalization capability;
   calculating a tap coefficient based on the received first preamble when the capability information indicates that the ONU has the equalization capability;
   sending the tap coefficient to the ONU;
   receiving upstream data that is sent by the ONU by using a second preamble; and
   equalizing the received upstream data based on the second preamble by using a second equalizer in the OLT.

2. The method according to claim 1, wherein:
   in a process in which the ONU performs registration, the steps of receiving capability information that is sent by an optical network unit ONU by using a first preamble, calculating a tap coefficient based on the received first preamble if the capability information indicates that the ONU has the equalization capability, and sending the tap coefficient to the ONU are performed.

3. The method according to claim 1, wherein:
   the OLT is applied to an Ethernet passive optical network (EPON) system;
   receiving capability information that is sent by an ONU by using a first preamble comprises:
     receiving a registration request message (REGISTER_REQ) that is sent by the ONU by using a default first preamble, wherein REGISTER_REQ carries the capability information; and
   sending the tap coefficient to the ONU comprises:
     sending a first authorization acknowledgment message (REGISTER1) to the ONU, wherein REGISTER1 carries the tap coefficient, or
     sending a second authorization acknowledgment message (GATE2) to the ONU, wherein GATE2 carries the tap coefficient.

4. The method according to claim 1, wherein:
   the OLT is applied to a gigabit-capable passive optical network (GPON) system or an XG-PON system;
   the method further comprises:
     sending a first downstream message to the ONU, wherein the first downstream message carries a length and a pattern of the first preamble and a length and a pattern of the second preamble; and
     when the OLT is applied to the GPON system, the first downstream message is an upstream management message (Upstream_Overhead), or when the OLT is applied to the XG-PON system, the first downstream message is a parameter set message (Profile);
   receiving capability information that is sent by an ONU by using a first preamble comprises:
     receiving a first upstream message that is sent by the ONU based on the first downstream message by using the first preamble, wherein the first upstream message carries the capability information, the first upstream message is a message after the first downstream message when the ONU performs registration, and the first upstream message is an ONU serial number message (Serial_Number_ONU); and sending the tap coefficient to the ONU comprises:
  sending a second downstream message to the ONU, wherein the second downstream message carries the tap coefficient, the second downstream message is a message after the first upstream message when the ONU performs registration, and the second downstream message is an ONU identifier assignment message (Assign_ONU-ID), a ranging authorization message (Request_Registration), or a delay equalization message (Ranging_Time).

5. The method according to claim 1, wherein:
the OLT is applied to a gigabit-capable passive optical network (GPON) system or an XG-PON system;
the method further comprises:
  sending a first downstream message to the ONU, wherein the first downstream message carries a length and a pattern of the first preamble; and
  when the OLT is applied to the GPON system, the first downstream message is an upstream management message (Upstream_Overhead), or when the OLT is applied to the XG-PON system, the first downstream message is a parameter set message (Profile);
receiving capability information that is sent by an ONU by using a first preamble comprises:
  receiving a first upstream message that is sent by the ONU based on the first downstream message by using the first preamble, wherein the first upstream message carries the capability information, the first upstream message is a message after the first downstream message when the ONU performs registration, and the first upstream message is an ONU serial number message (Serial_Number_ONU); and
sending the tap coefficient to the ONU comprises:
  sending a second downstream message to the ONU, wherein the second downstream message carries the tap coefficient and a length and a pattern of the second preamble, the second downstream message is a message after the first upstream message when the ONU performs registration, and the second downstream message is an ONU identifier assignment message (Assign_ONU-ID), a ranging authorization message (Request_Registration), or a delay equalization message (Ranging_Time).

6. The method according to claim 1, further comprising:
sending a coefficient update notification message to the ONU having the equalization capability;
receiving an update acknowledgment message that is sent by the ONU by using the first preamble;
re-calculating the tap coefficient based on the first preamble carried in the update acknowledgment message;
feeding back the calculated tap coefficient to the ONU.

7. An upstream data equalization method applied to an optical network unit (ONU), the method comprising:
sending capability information of the ONU to an optical line terminal (OLT) by using a first preamble, the capability information for indicating whether the ONU has an equalization capability;
receiving a tap coefficient fed back by the OLT;
updating a tap coefficient of a first equalizer in the ONU based on the tap coefficient;
equalizing upstream data by using the first equalizer; and
sending the equalized upstream data to the OLT by using a second preamble.

8. The method according to claim 7, wherein
in a process in which the ONU performs registration, the steps of sending capability information of the ONU to an optical line terminal OLT by using a first preamble, and receiving the tap coefficient fed back by the OLT are performed.

9. The method according to claim 7, wherein:
the ONU is applied to an Ethernet passive optical network (EPON) system;
sending capability information of the ONU to an OLT by using a first preamble comprises:
  sending a registration request message (REGISTER_REQ) to the OLT by using a default first preamble, wherein REGISTER_REQ carries the capability information; and
receiving the tap coefficient fed back by the OLT comprises:
  receiving a first authorization acknowledgment message (REGISTER1) sent by the OLT, wherein REGISTER1 carries the tap coefficient, or
  receiving a second authorization acknowledgment message (GATE2) sent by the OLT, wherein GATE2 carries the tap coefficient.

10. The method according to claim 7, wherein:
the ONU is applied to a gigabit-capable passive optical network (GPON) system or an XG-PON system;
the method further comprises:
  receiving a first downstream message sent by the OLT, wherein the first downstream message carries a length and a pattern of the first preamble and a length and a pattern of the second preamble, and
  when the ONU is applied to the GPON system, the first downstream message is an upstream management message (Upstream_Overhead), or when the ONU is applied to the XG-PON system, the first downstream message is a parameter set message (Profile);
sending capability information of the ONU to an OLT by using a first preamble comprises:
  sending a first upstream message to the OLT based on the first downstream message by using the first preamble, wherein the first upstream message carries the capability information, the first upstream message is a message after the first downstream message when the ONU performs registration, and the first upstream message is an ONU serial number message (Serial_Number_ONU) or a ranging response message (Registration); and
receiving the tap coefficient fed back by the OLT comprises:
  receiving a second downstream message sent by the OLT, wherein the second downstream message carries the tap coefficient, the second downstream message is a message after the first upstream message when the ONU performs registration, and the second downstream message is an ONU identifier assignment message (Assign_ONU-ID), a ranging authorization message (Request_Registration), or a delay equalization message (Ranging_Time).

11. The method according to claim 7, wherein:
the ONU is applied to a gigabit-capable passive optical network (GPON) system or an XG-PON system;
the method further comprises:
  receiving a first downstream message sent by the OLT, wherein the first downstream message carries a length and a pattern of the first preamble; and
  when the ONU is applied to the GPON system, the first downstream message is an upstream management message (Upstream_Overhead), or when the ONU is applied to the XG-PON system, the first downstream message is a parameter set message (Profile);

sending capability information of the ONU to an OLT by using a first preamble comprises:

sending a first upstream message to the OLT based on the first downstream message by using the first preamble, wherein the first upstream message carries the capability information, the first upstream message is a message after the first downstream message when the ONU performs registration, and the first upstream message is an ONU serial number message (Serial_Number_ONU) or a ranging response message (Registration); and receiving the tap coefficient fed back by the OLT comprises:

receiving a second downstream message sent by the OLT, wherein the second downstream message carries the tap coefficient and a length and a pattern of the second preamble, the second downstream message is a message after the first upstream message when the ONU performs registration, and the second downstream message is an ONU identifier assignment message (Assign_ONU-ID), a ranging authorization message (Request_Registration), or a delay equalization message (Ranging_Time).

12. The method according to claim 7, further comprising:
receiving a coefficient update notification message sent by the OLT;
sending an update acknowledgment message to the OLT by using the first preamble;
updating the tap coefficient of the first equalizer based on the received tap coefficient.

13. An upstream data equalization apparatus applied to an optical line terminal (OLT), the apparatus comprising:
a processor; and
a communications interface connected to the processor and configured to:
receive, under control of the processor, capability information that is sent by an optical network unit (ONU) by using a first preamble, the capability information for indicating whether the ONU has an equalization capability;
wherein the processor is configured to calculate a tap coefficient based on the received first preamble when the capability information indicates that the ONU has the equalization capability;
wherein the communications interface is further configured to:
send the tap coefficient to the ONU under control of the processor, and
receive, under control of the processor, the upstream data that is sent by the ONU by using a second preamble; and
wherein the processor is further configured to equalize the received upstream data based on the second preamble by using a second equalizer in the OLT.

14. The apparatus according to claim 13, wherein
the communications interface is further configured to: in a process in which the ONU performs registration, perform, under control of the processor, the step of receiving capability information that is sent by an optical network unit ONU by using a first preamble;
the processor is further configured to: in the process in which the ONU performs registration, perform the step of calculating a tap coefficient based on the received first preamble if the capability information indicates that the ONU has the equalization capability; and
the communications interface is further configured to: in the process in which the ONU performs registration, perform, under control of the processor, the step of sending the tap coefficient to the ONU.

15. The apparatus according to claim 13, wherein:
the OLT is applied to an Ethernet passive optical network (EPON) system; and
the communications interface is further configured to:
receive, under control of the processor, a registration request message (REGISTER_REQ) that is sent by the ONU by using a default first preamble, wherein REGISTER_REQ carries the capability information, and
under control of the processor, send a first authorization acknowledgment message (REGISTER1) to the ONU, wherein REGISTER1 carries the tap coefficient, or send a second authorization acknowledgment message (GATE2) to the ONU, wherein GATE2 carries the tap coefficient.

16. The apparatus according to claim 13, wherein:
the OLT is applied to a gigabit-capable passive optical network (GPON) system or an XG-PON system; and
the communications interface is further configured to:
send a first downstream message to the ONU under control of the processor, wherein the first downstream message carries a length and a pattern of the first preamble and a length and a pattern of the second preamble,
when the OLT is applied to the GPON system, the first downstream message is an upstream management message (Upstream_Overhead), or when the OLT is applied to the XG-PON system, the first downstream message is a parameter set message (Profile),
receive, under control of the processor, a first upstream message that is sent by the ONU based on the first downstream message by using the first preamble, wherein the first upstream message carries the capability information, the first upstream message is a message after the first downstream message when the ONU performs registration, and the first upstream message is an ONU serial number message (Serial_Number_ONU), and
send a second downstream message to the ONU under control of the processor, wherein the second downstream message carries the tap coefficient, the second downstream message is a message after the first upstream message when the ONU performs registration, and the second downstream message is an ONU identifier assignment message (Assign_ONU-ID), a ranging authorization message (Request_Registration), or a delay equalization message (Ranging_Time).

17. The apparatus according to claim 13, wherein:
the OLT is applied to a gigabit-capable passive optical network (GPON) system or an XG-PON system; and
the communications interface is further configured to:
send a first downstream message to the ONU under control of the processor, wherein the first downstream message carries a length and a pattern of the first preamble,
when the OLT is applied to the GPON system, the first downstream message is an upstream management message (Upstream_Overhead), or when the OLT is applied to the XG-PON system, the first downstream message is a parameter set message (Profile), receive, under control of the processor, a first upstream message that is sent by the ONU based on the first downstream message by using the first preamble, wherein the first upstream message carries the capability information, the first upstream message is a message after the first downstream message when the ONU performs registration, and the first upstream message is an ONU serial number message (Serial_Number_ONU), and send a second downstream message to the ONU under control of the processor, wherein the second downstream message carries the tap coefficient and a length and a pattern of the second preamble, the second downstream message is a message after the first upstream message when the ONU performs registration, and the second downstream message is an ONU identifier assignment message (Assign_ONU-ID), a ranging authorization message (Request_Registration), or a delay equalization message (Ranging_Time).

18. The apparatus according to claim 13, wherein:
the communications interface is further configured to:
    send, under control of the processor, a coefficient update notification message to the ONU having the equalization capability, and
    receive, under control of the processor, an update acknowledgment message that is sent by the ONU by using the first preamble;
the processor is further configured to re-calculate the tap coefficient based on the first preamble carried in the update acknowledgment message;
the communications interface is further configured to feed back the calculated tap coefficient to the ONU under control of the processor.

19. An upstream data equalization apparatus applied to an optical network unit (ONU), the apparatus comprising:
    a processor;
    a communications interface connected to the processor configured to:
        send, under control of the processor, capability information of the ONU to an optical line terminal (OLT) by using a first preamble, the capability information for indicating whether the ONU has an equalization capability, and
        receive, under control of the processor, a tap coefficient fed back by the OLT;
    wherein the processor is configured to:
        update a tap coefficient of a first equalizer in the ONU based on the tap coefficient, and
        equalize upstream data by using the first equalizer; and
    wherein the communications interface is further configured to send, under control of the processor, the equalized upstream data to the OLT by using a second preamble.

20. The apparatus according to claim 19, wherein:
the communications interface is further configured to:
    receive, under control of the processor, a coefficient update notification message sent by the OLT, and
    send, under control of the processor, an update acknowledgment message to the OLT by using the first preamble; and
the processor is further configured to update the tap coefficient of the first equalizer based on the received tap coefficient.

* * * * *